HIGH SPEED LANDCRAFT

Filed Sept. 4, 1948 8 Sheets-Sheet 1

INVENTORS
JOHN K. NORTHROP
CLAUDE A. BROSTERHOUS
LEIGH E. DUNN
JOHN M. ELLISON
DICK R. HERMAN
By Hubert E. Metcalf
Attorney Nov. 29, 1955 J. K. NORTHROP ET AL 2,724,966

HIGH SPEED LANDCRAFT

Filed Sept. 4, 1948 8 Sheets-Sheet 2

JOHN K. NORTHROP
CLAUDE A. BROSTERHOUS
LEIGH E. DUNN
JOHN M. ELLISON
DICK R. HERMAN
INVENTORS

BY Herbert E. Metcalf
Attorney

HIGH SPEED LANDCRAFT

Filed Sept. 4, 1948 8 Sheets-Sheet 3

INVENTORS
JOHN K. NORTHROP
CLAUDE A. BROSTERHOUS
LEIGH. E. DUNN
JOHN M. ELLISON
DICK R. HERMAN
By Herbert E. Metcalf
Attorney

HIGH SPEED LANDCRAFT

Filed Sept. 4, 1948 8 Sheets-Sheet 4

JOHN K. NORTHROP
CLAUDE A. BROSTERHOUS
LEIGH E. DUNN
JOHN M. ELLISON
DICK R. HERMAN
INVENTORS

BY Herbert E. Metcalf
Attorney

Nov. 29, 1955 J. K. NORTHROP ET AL 2,724,966

HIGH SPEED LANDCRAFT

Filed Sept. 4, 1948 8 Sheets-Sheet 5

INVENTORS
JOHN K. NORTHROP
CLAUDE A. BROSTERHOUS
LEIGH E. DUNN
JOHN M. ELLISON
DICK R. HERMAN

By Herbert E. Metcalf
Attorney

Nov. 29, 1955 J. K. NORTHROP ET AL 2,724,966

HIGH SPEED LANDCRAFT

Filed Sept. 4, 1948 8 Sheets-Sheet 6

JOHN K. NORTHROP
CLAUDE A. BROSTERHOUS
LEIGH E. DUNN
JOHN M. ELLISON
DICK R. HERMAN
INVENTORS

BY Herbert E. Metcalf
Attorney

JOHN K. NORTHROP
CLAUDE A. BROSTERHOUS
LEIGH E. DUNN
JOHN M. ELLISON
DICK R. HERMAN
INVENTORS

BY Herbert E. Metcalf
Attorney

Nov. 29, 1955    J. K. NORTHROP ET AL    2,724,966

HIGH SPEED LANDCRAFT

Filed Sept. 4, 1948    8 Sheets-Sheet 8

JOHN K. NORTHROP
CLAUDE A. BROSTERHOUS
LEIGH E. DUNN
JOHN M. ELLISON
DICK R. HERMAN
INVENTORS

BY Hubert E. Metcalf
Attorney

United States Patent Office 2,724,966
Patented Nov. 29, 1955

2,724,966

HIGH SPEED LANDCRAFT

John K. Northrop, Los Angeles, Claude A. Brosterhous, Long Beach, Leigh E. Dunn, Manhattan Beach, John M. Ellison, Gardena, and Dick R. Herman, Los Angeles, Calif., assignors to Northrop Aircraft, Inc., Hawthorne, Calif., a corporation of California Application September 4, 1948, Serial No. 47,914

15 Claims. (Cl. 73—147)

The present invention relates to high speed landcraft and, more particularly, to landcraft capable of being safely propelled over land at speeds including supersonic velocities.

Previous attempts to attain high velocities on land while maintaining contact therewith have been made by the use of wheeled vehicles, an official world's record speed of slightly less than 400 miles per hour having been made by a specially constructed automobile. Even at these relatively low speeds the difficulties of handling the centrifugal force acting on the wheels and tires, and of dealing with vertical and lateral forces and moments tending to displace the vehicle from its proper course, indicate that transonic and supersonic speeds cannot be expected to be attained by such a land vehicle. Furthermore, human guidance has been required to maintain the vehicle on a predetermined course, and the ability of the human body to sense undesirable accelerations and to react to correct them in the time required is rapidly approaching a limit beyond which safe speeds cannot be attained with human guidance.

In order to attain supersonic speeds over land, while maintaining a guiding contact with the ground, an entirely different approach is required.

The mere problem of coupling a substantial mass to the ground so that it will follow a predetermined course at supersonic speeds is a complicated one. The mass cannot be progressed on wheels of any type for many reasons, among them being the creation of enormous centrifugal forces in wheels of any size at high velocities, and the inability of such wheels to accelerate sufficiently fast to obtain the desired rolling velocity. Furthermore, extremely small dimensional variations in such wheels would cause large undesirable accelerations. While the mass must be easily accelerated and propelled at high velocities over a desired course, it must be so constructed and coupled to the ground that lateral and vertical accelerations can be limited to values that will not destroy the required coupling necessary to keep the mass on the desired course.

It is, therefore, a broad object of the present invention to provide a means and method of so coupling a mass to the ground that the mass can be accelerated to travel safely over a predetermined course of substantial length at supersonic velocities.

It has been found that a large mass can be coupled to the ground, and stay coupled thereto while being propelled at supersonic speeds, by completely discarding the wheel of civilization, and reverting to the more ancient principle of the sled, and it is another broad object of the present invention to provide a means and method of slidably coupling a mass to the ground and to hold the mass to a predetermined course at velocities including the supersonic.

The term "slidably coupled" as used in the following description and claims is defined to mean a means and method of restraining a mass to follow a stationary guide member while being progressed therealong in a manner developing sliding friction only between said mass and said guide member.

A landsled capable of being propelled at supersonic speeds has exceptional value in the field of aerodynamics, as for example, for transport of full scale or subscale aircraft and/or aircraft components, either for aerodynamic tests, or for launching purposes, at speeds hitherto precluding recovery of the vehicle in undamaged condition. The vehicle must be restrained to follow a predetermined course of limited length, it must be accelerated to a desired velocity and then preferably should be decelerated to a stop without damage. When used in the aerodynamic field it must be able to transport an aircraft or part thereof in such a manner that no damage is done to the aircraft or part carried, or to instruments mounted either in the vehicle or the aircraft, at any desired speed.

It is, therefore, another broad object of the present invention to provide a land vehicle capable of acceleration and deceleration over a predetermined course of limited length and at high acceleration and deceleration rates, with in some instances an intermediate constant velocity run of signficant length including a choice of subsonic, transonic, and supersonic speeds while transporting aircraft or components thereof, large or small.

In broad terms as to apparatus, the present invention comprises a sled mounted on a track of predetermined length by means of sled slippers coupling the sled to the track, together with means for accelerating the sled to travel over the track at a desired velocity. Preferably the sled is decelerated rapidly to zero velocity before the end of the track has been reached.

In one aspect of the invention as described herein, the sled is used as an aerodynamic test facility and is controlled to make a constant velocity run between acceleration and deceleration thereof, and carries a relatively small aircraft or aircraft model or surface component on which aerodynamic data are desired, togetherd with means for measuring and recording forces acting on the model or model surface during the test. The aircraft or part being tested is carried with the sled to the end of its run.

In another herein described aspect of the invention, the sled is used as an aircraft launching facility and is controlled to accelerate aircraft capable of free flight mounted thereon to a velocity where free flight can take place, the sled being decelerated as soon as the aircraft leaves the sled, the empty sled then being stopped for repeated reuse.

As the flight test aspect of the present invention particularly concerns sled travel in the transonic speed range from Mach number .8 to Mach number 1.3 for the purpose of testing airfoils, this aspect will be first discussed.

Previous attempts to obtain reliable aerodynamic data in the speed range from Mach number 0.9 to 1.2 have been necessarily confined solely to free flight measurements, because the conventional wind tunnel as an aerodynamic aid is often unreliable in this transonic speed zone. The failure of wind tunnel techniques is due primarily to the fact that, considering two-dimensional flow in a compressible fluid, the rate of change of speed with cross-sectional area becomes infinite at the speed of sound. For subsonic flow, this derivative is negative, so that for very small decreases in cross-sectional area, large increases in velocity occur.

Thus, the addition of an aircraft model to a high speed subsonic wind stream in a wind tunnel will cause the flow to become sonic at approximately the point of maximum model cross-section, thereby effectively choking the flow.

Wind tunnel data taken within 0.03 to .005 of the choking Mach number are today considered fairly reliable, but in order to obtain useable data at $M=0.9$ corresponding to a choking Mach number of .93 to .95, the model cross-sectional area must be reduced to about ¼ of 1% of the wind tunnel cross-sectional area, and the prospects of obtaining useable data at Mach numbers much above 0.9 are remote except in extremely large wind tunnels.

On the other hand, for supersonic flow, the variation of speed with cross-sectional area increase is positive, so that for small increases in area the flow velocity rapidly increases. However, diffusers designed to give working section Mach numbers up to about 1.2 are basically unstable due to the action of the boundary layer which effectively reduces the cross-sectional area, thereby reducing the velocity, and thus further increasing the boundary layer until the entire duct is again choked. Even if flow could be stabilized, the allowable model size would approach zero at M=1.0.

In the absence of any other apparent solution to these difficulties, investigators have been relying largely on flight test techniques of various kinds to obtain aerodynamic data in the transonic speed zone. However, tests made on missiles shot or dropped through the air are of questionable accuracy, in that values of many of the aerodynamic forces are obtained indirectly from acceleration data, in some cases radiotelemetered to a ground receiving station, or obtained by differentiation of space-time or velocity-time curves. Present day techniques along this line obtain drag data with reasonable accuracy, but other desired data obtained in this manner are as yet quantitatively unreliable. Furthermore, this technique has a basic disadvantage that in most instances the model is badly damaged or destroyed.

The wing flow technique is another attempt to bridge the transonic zone by means of flight test. In this case, small models are mounted over the point of maximum thickness of an airplane wing, so that at high airplane speeds the model is subjected to the transonic flow field existing above the wing. This method has one advantage in that it permits direct model balance readings, but it also has a fundamental disadvantage that the tests are conducted in a non-uniform flow field. This latter objection becomes particularly important for the testing of swept wings, since the basic span loadings may be radically changed.

Objects of the present invention with respect to its aerodynamic test aspects are:

To provide a means and method of obtaining reliable aerodynamic data particularly in the transonic speed zone.

To provide an aerodynamic test facility free from the effects of choking interference in the transonic speed zone.

To provide an aerodynamic test facility that will permit the transmission and recording of direct balance readings from models positioned on a neutral or stable base mount moving at high velocities.

To provide an aerodynamic test facility which will transport sufficiently large models at high velocities to reduce the magnitude of scale errors to insignificance.

To provide an aerodynamic test facility that avoids destruction of models tested at high velocity, enabling a more accurate model to be used for a series of tests with the same instrumentation.

To provide an aerodynamic test facility that will supply direct information of lift, drag, side load, pitching moment, rolling moment and yawing moment of relatively large scale models moved by a land vehicle at high speeds, particularly those between Mach numbers 0.9 to 1.2.

When airfoils positioned at substantial angles of attack with respect to the sled are carried by a sled at high velocities, large side loads are applied to the sled, greatly increasing slipper friction by creating rolling and twisting forces on the sled.

It is still another object of the invention to provide a means and method of stabilizing a sled travelling at high velocities when side loads are developed on the sled tending to render the sled unstable.

In a preferred form for use as an aerodynamic test facility, the invention comprises a sled mounted on rails by means of restraining slippers coupled to the rails, and rocket driven at high velocities over a track 10,000 feet long, for example. A model is positioned on a boom projecting forwardly from the sled to be moved through free air as the sled progresses over the track, means are provided to measure the aerodynamic forces acting on the model, and if the model is provided with a wing or wings, the model is preferably mounted with the wing vertical, with a distance of approximately 2 to 3 half spans between the lower wing tip and the ground to avoid choking effects and to prevent shock waves from being reflected back to the model, thus eliminating wall effect. The forces acting on the model, when measured, are either radiotelemetered to an adjacent radio receiver and recorded as the sled moves over the track, or are directly recorded on the sled. Means are provided to measure sled velocity. On a 10,000 foot track, acceleration areas from 1,200 to 3,000 feet may be used in which the sled is accelerated at the rate of 10–20 $g$'s, and the sled is decelerated to zero velocity at substantially the same rate by a brake over the last 1,600 to 2,500 feet of track leaving from 4,500 to 7,200 feet of track available for substantially constant velocity runs at speeds of from Mach number 0.8 to 1.3. This permits an observation and data recording time interval of approximately 3 to 5 seconds during the free run at the latter speed. The symbol $g$ is used herein as representing the acceleration of gravity.

When higher acceleration and deceleration rates are permissible the constant velocity run can be made longer.

The problem of launching high speed aircraft by auxiliary power applied to the aircraft to obtain initial acceleration has also been heretofore approached in several ways. Auxiliary rockets have been attached to the aircraft and fired during the take-off run, leaving the rocket motors attached to the aircraft. This technique of initial acceleration has proved satisfactory for assisting the take-off of relatively low speed aircraft of conventional types, but requires that the weight of the empty rocket motors be carried at all times by the aircraft in flight, not only adding to the load, but in many cases adding a significant aerodynamic drag to the aircraft.

Another technique hitherto utilized is to provide aircraft launching by auxiliary power provided by rocket motors and supporting structure that separates from the aircraft in flight after the auxiliary thrust has ceased, the motors then falling to the ground to be badly damaged or totally destroyed by impact with the ground. As launching devices of this sort are necessarily expensive it is clear that a vehicle capable of launching the aircraft at a desired high speed but which can be separated from the aircraft after the latter has attained flight speed and recovered intact will greatly reduce launching costs.

Accordingly, other objects of the present invention are, with respect to its launching aspect:

To provide a means and method of launching an aircraft at high speeds, in which a restrained launching vehicle is utilized to supply all or part of the takeoff acceleration; the vehicle being recoverable intact after the aircraft has been separated from the sled;

To provide a launching vehicle capable of accelerating free flight aircraft to high speeds over a limited acceleration area, and capable of rapid deceleration to a stop after the aircraft has been launched;

And to provide a landcraft capable of carrying heavy weights at high speeds over a track.

In a preferred form for use as a launching facility for an aircraft capable of free flight, the invention comprises a sled mounted on rails by means of restraining slippers coupled to the rails, and rocket-driven to subsonic velocities over a track 1,000 feet long, for example. A full scale aircraft is supported by the sled, the thrust being transmitted to the aircraft by one or more thrust members through terminal fittings permitting separation of the sled and aircraft at a free flight speed of the latter. The sled is then rapidly decelerated to a stop. On a 1,000 foot track a heavy aircraft is accelerted at a rate of about 4.7 *g*'s to approximately 300 M. P. H. for example over 640 feet of the track, the sled being thereafter decelerated to a stop by a water brake, operating over the remaining track length of 360 feet.

In both aspects of the invention the land track upon which the land vehicle travels must necessarily be carefully dimensioned and alined in order to minimize lateral and vertical accelerations during high velocity travel of the sled over the track. As such careful alinement of the track increases the expense thereof, it is still another object to provide a means and method of rapidly accelerating and decelerating a vehicle to a desired high speed, including supersonic speed, over a minimum of track length and with predetermined acceleration and deceleration rates.

The problem of decelerating a land vehicle travelling at high speeds over a track is a serious one if the practical and economic aspects of the problem are to be considered. As the track has to be held to exceptionally close tolerances as to lateral and vertical deviations from a mean track line, and must be mounted on a heavy and firm foundation, the track is expensive, the track described herein costing on the order of $150,000 per mile to purchase, lay and adjust. The sled, if allowed to come to a stop under the forces of air resistance and slipper friction along would travel over several miles of track. Consequently, it is highly desirable to provide rapid deceleration of the sled over a minimum extent of track.

It might appear at first glance that rocket motor deceleration using forwardly exhausting rockets, would be ideal to stop the sled in a limited distance. However, it must be remembered that the rocket motor structure and the decelerating fuel must be carried from the start throughout the accelerating run, and the constant velocity run if performed, and that for every *g* of acceleration, every pound of weight carried by the sled has to be matched by an additional amount of acceleration fuel plus the weight of additional tankage required to hold the added fuel volume. For a 15 *g* acceleration of the sled, 15 pounds of acceleration thrust must be added for every pound of weight added to the sled by decelerating rocket structure and deceleration fuel therefor. In consequence, considering the cost of the decelerating motors, the cost of the decelerating fuel, and the cost of the extra fuel required to accelerate the decelerating rocket motors and fuel therefor; the total cost of using rockets for deceleration is excessive when repeated runs of the sled are to be made.

Furthermore, there is always a possibility that decelerating rockets might not function properly, might not ignite, or not deliver full thrust, with the result that the sled would run off the track with a consequent total destruction of valuable equipment. Such a malfunction would not be serious if occurring in the accelerating rockets, as the sled would simply not reach the desired speed. If occurring in a decelerating rocket, the result would be a catastrophe. It is necessary, therefore, that a simple, effective, accurate and positively operating brake be provided for the vehicle, preferably one that has no moving parts capable of malfunction, and which will prevent the sled from leaving the track under all conditions, barring structural failure. It is still another object of the present invention to provide such an ideal brake.

Other objects and advantages of the present invention in all of its aspects will be apparent from the ensuing description of the drawings, which show preferred forms of the invention solely by way of illustration, and not limitation, as other forms of the invention within the scope of the appended claims will be apparent to those skilled in the art.

Figures 8, 17, 17A, 18:
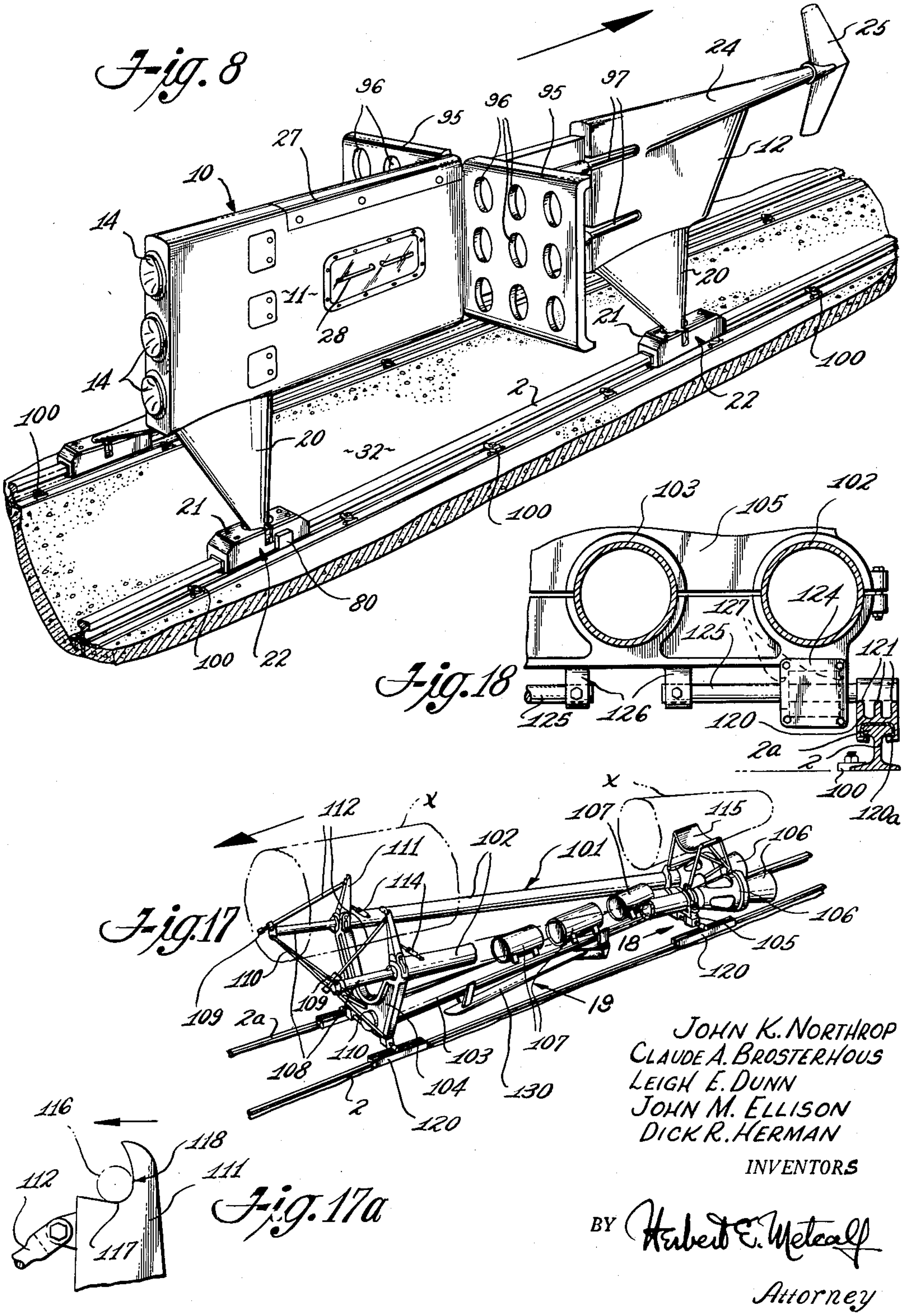
Figure 8 is a perspective view of a sled equipped with air brakes.
Figure 17 is a perspective view of a launching sled and track.
Figure 9:
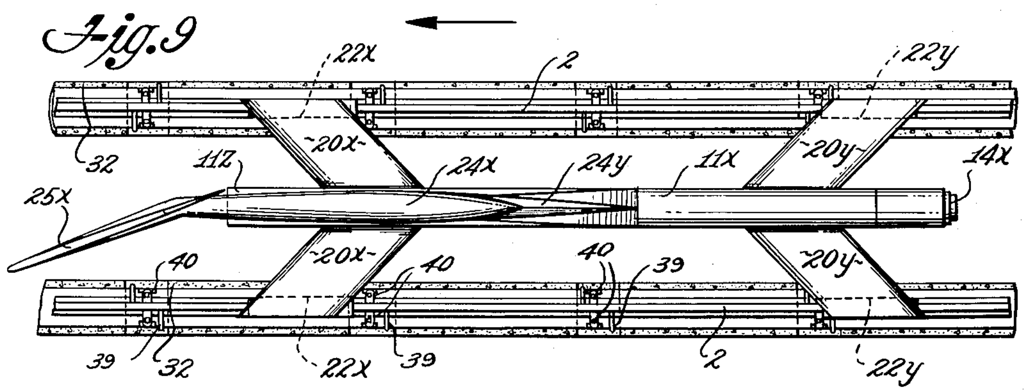
Figure 9 is a top plan view of an unsprung test facility sled adapted to withstand high side loads.

Figure 17*a* is a side view of the end of a thrust member as used on the sled of Figure 9.

Figure 18 is a front view, partly cut away, of a slipper and elastic mount for the sled of Figure 17, taken as indicated by the arrow labelled 18 in Figure 17.

Figure 19:
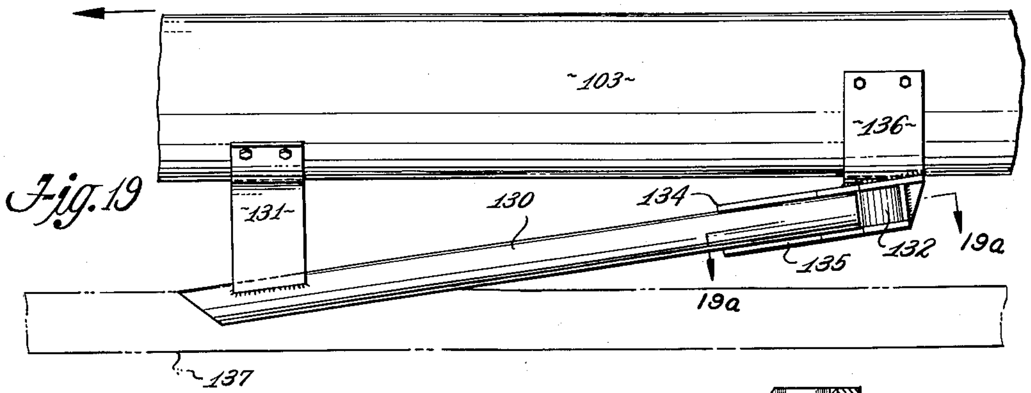

Figure 19 is a side view of a water deflector as applied to the sled of Figure 17, taken as indicated by the arrow labelled 19 in Figure 17.

Figure 19A:
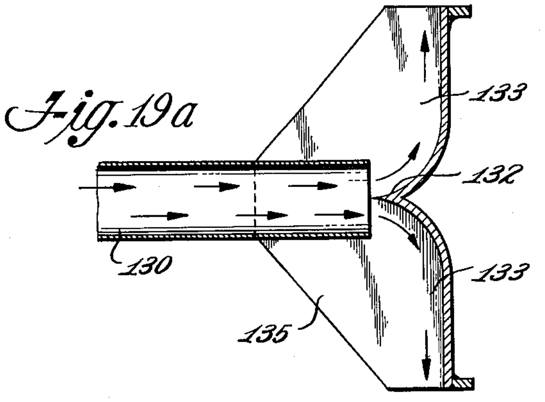

Figure 19*a* is a sectional view showing water paths in the deflector of Figure 19, taken as indicated by line **19*a*—19*a*** in Figure 19.

Figure 20:
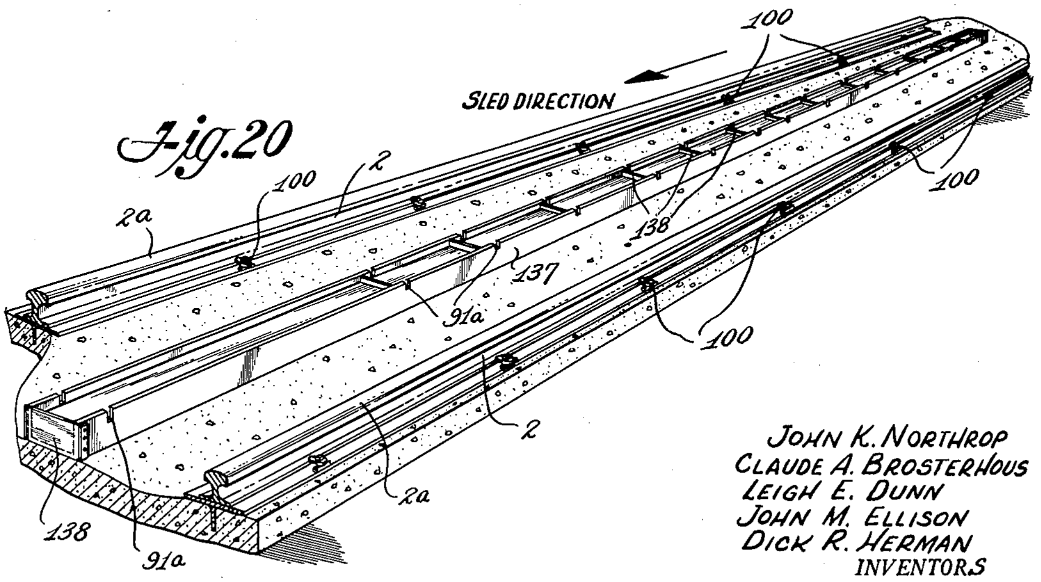

Figure 20 is a perspective view of a water trough as used in conjunction with the deflector shown in Figure 19.

*Test facility track*

Figure 1:
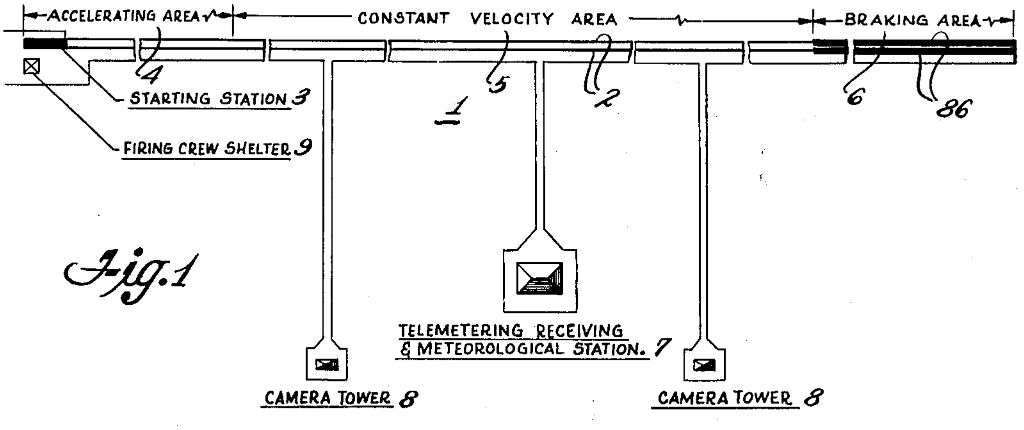
Figure 1 is a diagrammatic plan view of a track layout suitable for land vehicle restraint at supersonic speeds and below.

A preferred track and control layout for an aerodynamic test facility is shown in Figure 1. Track 1 is 10,000 feet long, comprising two parallel rails 2, straight and carefully alined both laterally and vertically, as will be described later, to have a variation of about plus or minus 1/32 inch from the mean track line.

At the beginning of the track is a starting station 3 leading into an acceleration area 4, followed by a constant velocity area 5. The track terminates in a braking area 6.

A radio receiving, telemetering and meteorological station 7 is positioned at one side of the track at approximately the middle thereof, with camera towers 8 on each side of station 7, for the support of high speed monitoring cameras used to photograph sleds propelled over the track. Adjacent the starting station is a firing crew shelter 9.

*Test facility sled*

Figures 2, 3:
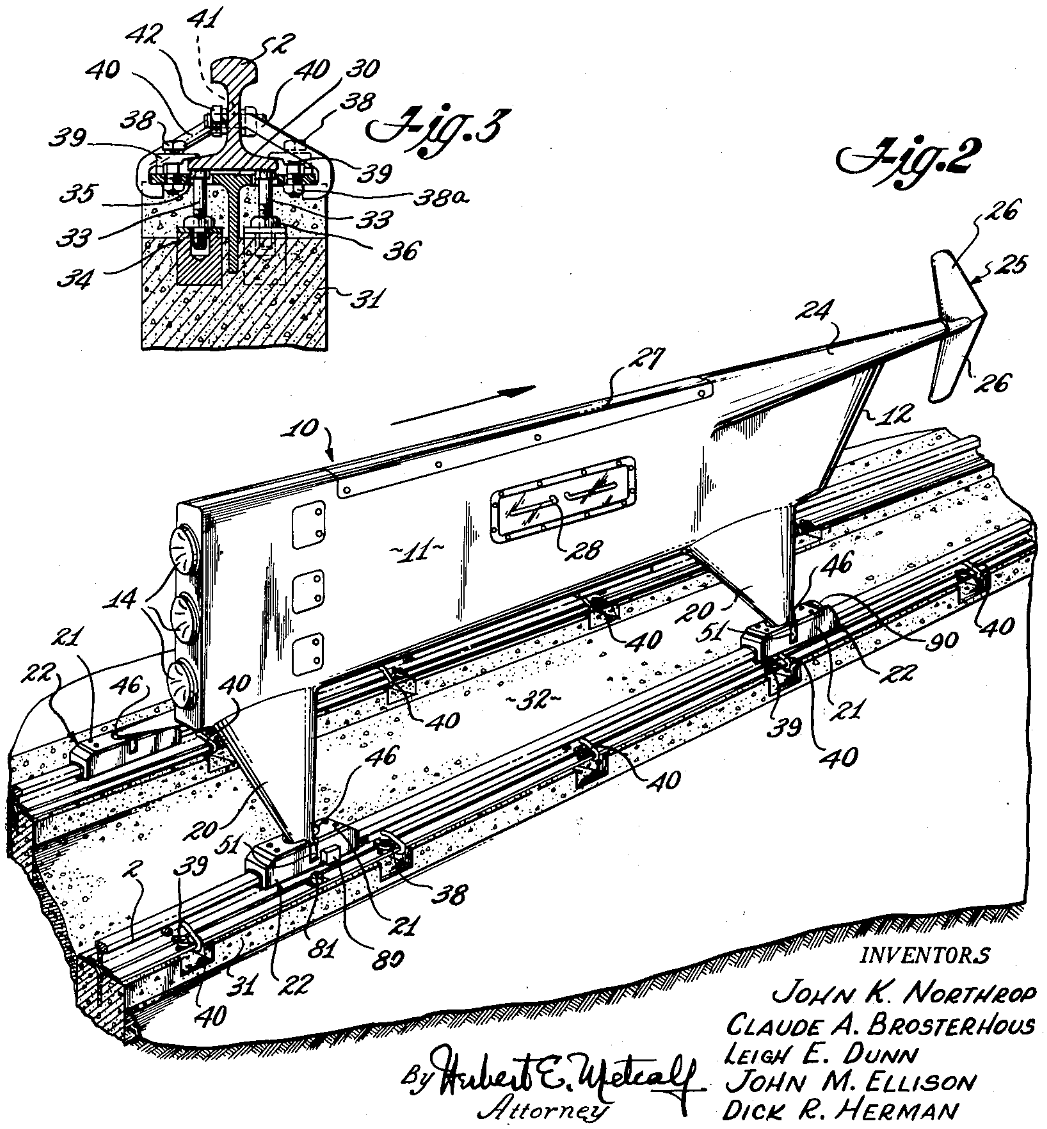
Figure 2 is a perspective view of a test facility sled for use on the tracks of Figure 1.
Figure 3 is a cross-sectional view of an adjustable rail that can be used in alining the track of Figure 1.

One form of sled 10, suitable for carrying relatively small models, or models at relatively low angles of attack so that relatively light loads are carried by the sled-track coupling is shown grossly in Figure 2. This sled comprises a vertical, thin sled body 11 with a sweptback leading edge 12, and carries three rockets, the tail cones 14 of which project at the rear of the sled body. Liquid fuel rockets are preferred, as they adapt themselves to a varied test program in that the thrust can be readily controlled. Acid-aniline has been found satisfactory as a rocket fuel, but it is not desired that the invention be limited to the use of any particular type of rocket fuel as solid fuels can also be utilized. The sled body, having a minimum horizontal extent, has minimum lift characteristics.

The sled body 11 is mounted on four streamlined, downwardly and outwardly extending legs 20, each terminating in an elastic mounting casing 21 forming a part of sled restraining slippers 22 mounted to slide on track rails 2 and coupling the sled to the rails against all down, side, or up loads.

Extending forwardly from the top of sled body 11 is a model supporting boom 24, terminating in a supported model 25, in this case a model airplane having sweptback wing panels 26. The top of the body is provided with a removable cover 27 providing access to the rocket mechanism and the telemetering circuits carried by the sled within the body thereof. Force measuring devices are incorporated in boom 24 and will be described later. One or more radio antennas 28 of the slot type, for example, are provided as needed in the side of sled body 11 facing the telemetering receiving station 7.

*Test track alinement*

The ideal free air test facility involving a sled such as above described, travelling on slippers at transonic velocities along rails would require rails of zero tolerance in cross-sectional dimension, these rails being perfectly alined with respect to each other. An ideal track should also have zero vertical and lateral displacements from a straight line. However, any physical track, regardless of the care with which it is laid and adjusted will follow some course other than a straight line. The mean average of this course or curve (e. g. a sinusoidal curve) could, however, be very close to a straight line. A sled moving along the rails and following both laterally and vertically the deviations of the rails will induce accelerations in its structure and in a model carried by it. These accelerations can be limited to a minimum value, for example, on the order of plus or minus 0.1 *g*, by careful alinement of the rails, and by elastically mounting the sled on the slippers.

The track can be carefully alined vertically and laterally as shown in Figures 2 and 3.

Rails 2 are heavy railroad rails carefully chosen as to original dimensions and machined to remove scale. The rails 2 are adjustably held above a heavy foundation plate 30 having a portion cast into concrete foundation 31. Foundation 31 is provided at 2 ft. intervals with adjustment recesses 32. Plate 30 passes over these recesses, and both vertical and lateral rail adjustment means are accessible in the recesses.

For vertical adjustment, the rails rest on the heads of two laterally spaced vertical adjustment bolts 33 erected from foundation pads 34 cast into the bottom of each recess. The bolt heads are partly in hexagonal holes 35 in plate 30 so that they cannot rotate, and the bolts are provided with nuts 36 resting on the pads 34. Rotation of nuts 36 on the pads will vertically position the rail as desired.

The rails are held down on the heads of bolts 33 by opposite holddown bolts 38 passing through plate 30 below, and through holddown members 39 extending over the rail base. Holddown nuts 38a beneath plate 30, when tightened will clamp the rail solidly between the holddown members 39 and the heads of the vertical adjustment bolts 33. Thus, accurate vertical adjustment can be obtained.

Lateral alinement is provided by opposite rail hooks 40, passing around the opposite lateral edges of foundation plate 30 at the recesses, and then extending inwardly through adjacent web holes 41. The rail web ends of the hooks 40 are threaded to receive lateral adjustment nuts 42. The track can be adjusted laterally by the relative position of nuts 42. It will be noted that the hooks 40 are shaped and positioned to help the rails resist side loads imposed thereon by the sled.

Preferably the rails are adjusted to have a deviation from a straight line of plus or minus $\frac{1}{32}$ inch, both laterally and vertically, although a higher tolerance may be permissible by adjustment of the elastic mountings, and a lower tolerance may be required when the sled is not sprung, as will be later pointed out.

*Test sled slippers*

Proper slipper design involves a primary objective of efficient heat transfer, wear resistance and positive track coupling. When a relatively light sled is being used, and when the side loads on the sled are relatively light or when relatively low speeds are to be attained, a relatively simple slipper can be utilized.

Figure 4:
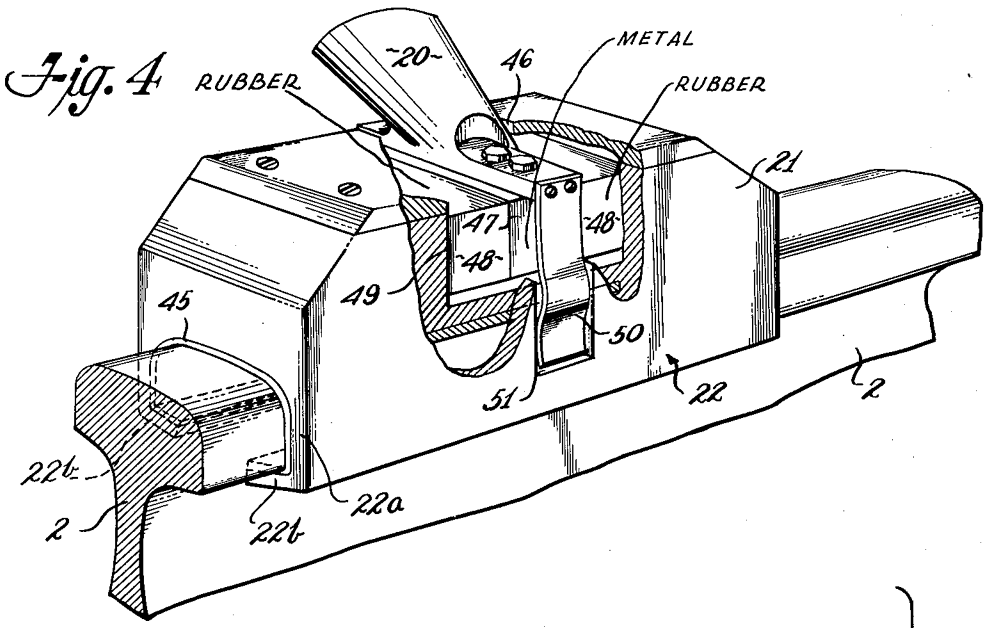
Figure 4 is a perspective view partly cut away, showing a rear slipper and elastic mounting as used on the sled of Figure 2.

A typical rear slipper and slipper mounting for light loading is shown in Figure 4. Here, the slipper 22 is provided with a renewable load bearing insert 45 contacting the rail 2 and firmly attached to the slipper. Slipper sides 22a project downwardly over the sides of the rail to terminate in inturned restraining flanges 22b hooking underneath rail 2 to resist lift. Preferably all rail contacting surfaces are also a part of the renewable insert 45.

The insert 45 for light loads or relatively short runs is preferably formed from stainless steel, a material which has been found by test to possess excellent wear resistance and heat resistance characteristics. It is softer than the rail and does not tend to score the rail. It does not harden appreciably in use and the rate of wear is low if not too highly loaded. The slipper body is made of light weight metal having good heat conducting characteristics, such as magnesium or aluminum alloy, and when used under light loads no other cooling arrangements are needed, as the heat generated in the inserts is drained away sufficiently fast through the slipper body. As it is of great importance to reduce yaw of the sled to a minimum, in order that the angle of attack of the model can be controlled, and in order to reduce the amplitude of vibration, only a small clearance (less than $\frac{1}{16}$ inch) between the slipper and the rail can be permitted.

The coefficient of friction between insert and rail can be reduced by use of a suitable lubricant on the smooth rail surfaces. This lubricant should be dry in order to avoid accumulation of sand and dirt. A number of materials can be used for this purpose, provided they give a low friction factor and prevent the rails from rusting, as rust is to be avoided as it increases the friction factor over that of a clean rail. After extensive tests, it has been found that a mixture of flake or colloidal graphite in a wax solution applied to the rail, with additional graphite buffed into the mixture when dry to produce a polished surface, is highly satisfactory. Wear of a stainless steel insert after a short run of a light sled at 1,400 feet/second has been found to be as low as .003 inch when using the above lubricant. Other types of slippers designed for high loads will be later described.

*Elastic mounting for test sled*

Even with a track held to a deviation tolerance on the order of plus or minus $\frac{1}{32}$ inch, lateral and vertical accelerations can be reduced by elastically mounting the sled on the slippers as close to the slippers as possible, to provide a minimum of unsprung weight. One form of elastic mounting found satisfactory in providing two degrees of freedom, is also shown in Figure 4.

The slipper 22, is extended upwardly as the mounting casing 21, and a sled leg 20 enters the casing 21 through an upper aperture 46. Leg 20 terminates within the casing 21 in a vertical metal block 47 positioned normal to rail 2, and larger than aperture 46. Metal block 47 is bonded to rubber blocks 48 on each side thereof, these blocks in turn being bonded to the front and rear inside walls 49 of the mounting casing 21. Heavy metal springs 50 extend downwardly from metal block 47 in slots 51 on each side of the slippers to terminate opposite the rail head. Springs 50 prevent the slippers from rolling under side loads. Thus, the sled body is sprung in all directions, the casing 21 preventing leg and sled separation in case the rubber blocks should fail. The front slippers and leg mountings are similar, with the exception that the slipper and casing has a contoured front surface for water braking, as will be described later.

Figure 5:
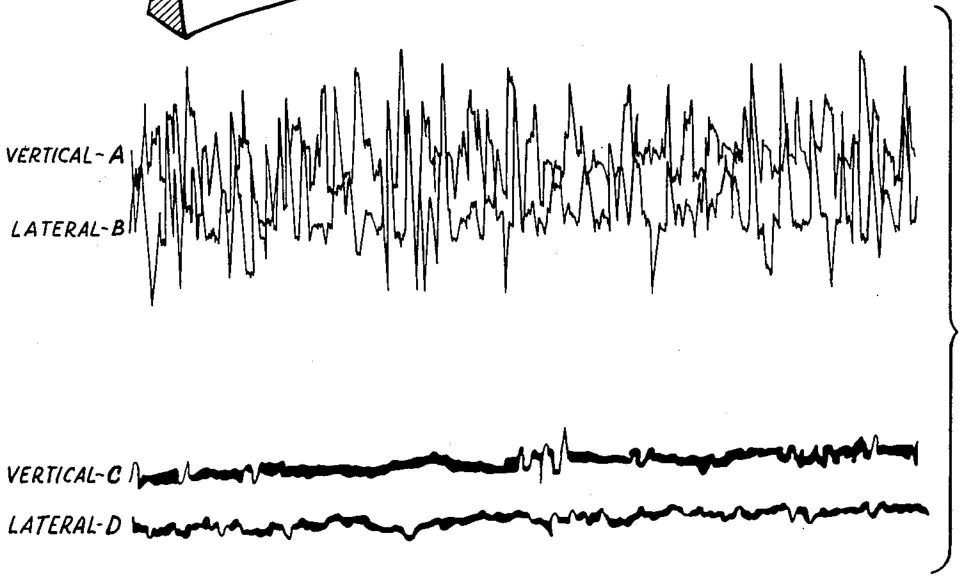
Figure 5 is a reproduction of accelerometer records taken on the sled of Figure 2 during travel over the track of Figure 1.

In order to show the action of elastically mounting the sled on the slippers, typical oscillographic records are reproduced (except for minor details) in Figure 5. These records were made from accelerometers mounted on a sled travelling on a track of railroad rails having a ⅛ inch maximum deviation laterally and vertically, at 380 feet/second. Record traces A and B show vertical and lateral accelerations of an unsprung sled, and record traces C and D show vertical and lateral accelerations of a sled equipped with the elastic mountings just above described. The reduction in both vertical and lateral accelerations in the sprung sled is striking. Additional runs at higher speeds confirm these results.

In discussing track tolerance, it was stated that track tolerances might be made greater by lowering spring constants. However, such a solution does not limit vibrational accelerations and it has been found that it is not satisfactory to reduce lateral and vertical accelerations to 0.1 $g$ by lowering spring constants to obtain lower natural frequencies, and not lower track tolerances, because the existing forces of weight, unsymmetrical air loads and longitudinal acceleration create an initial displacement of the elastic mounts to the point that they become unwieldy in design and permit models carried by the sled to adopt greatly increased angles of attack by large deflections in the sled spring.

A rough track spring relationship can be given as follows: When the forced frequency is equal to or greater than three times the natural frequency P of the sprung mass of the sled, then for the range of the free run velocities, Mach number 0.8 to 1.3, assuming $$\frac{P}{2\pi}\leq 4$$

cycles per second, the wavelength of the rails should be equal to or less than 75 feet. For higher velocities or shorter wavelengths the lateral and vertical accelerations do not increase.

Thus, while it is desirable that the track deviation amplitude be held within plus or minus 1/32 inch with wavelengths not exceeding 75 feet, the mean line of the rails need not be exactly a straight line, but can follow any shaped curve in the horizontal and vertical planes, provided the radius of the mean line is such that the centrifugal force at maximum sled velocity is not greater than 0.1 to .25 $g$ and provided the wavelength of the mean line is such that at maximum sled velocity the forced frequency from the track is not greater than one-half the natural frequency of the sled. This condition is obtained if the track radius is $\geqq$1,300,000 feet and if the inflection points of the mean track line occur not oftener than at 500 foot intervals. Vertical inflections may be desirable and may be utilized in water braking, later discussed.

*Test sled boom*

Figure 6:
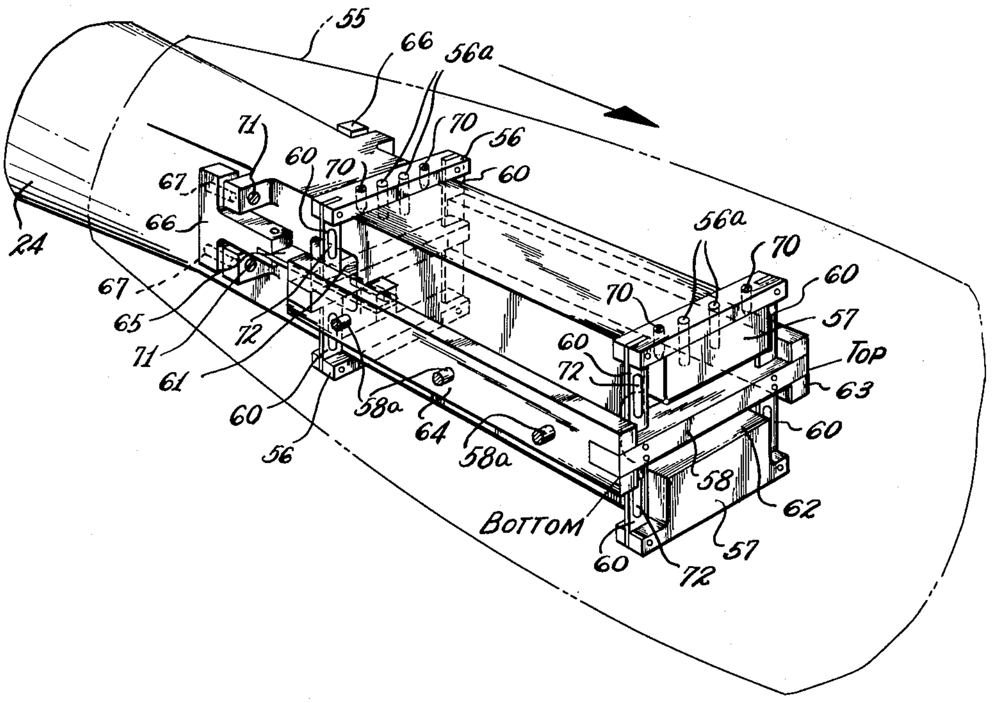
Figure 6 is a perspective view of strain measuring devices as used on the boom of the sled of Figure 2.

As the ultimate object of making a sled run over the test facility track is to make measurements of aerodynamic forces acting on a model attached to the forward end of boom 24, strain measuring devices are interposed between the model and that portion of the boom solidly attached to the sled body 11. One arrangement of measuring devices is shown in Figure 6, whereby lift, drag, and pitching moment can be measured by the use of the electrical resistance type of strain gage. The outputs of such gages are readily fed to telemetering radio transmitters, as is well known in the art.

In Figure 6, the outer end of boom 24 enters, for example, the rear of a central nacelle 55 of the model airplane 25 whose characteristics are to be measured, and is spaced from the walls of the nacelle from which wing panels 26 project. For clarity only the nacelle portion of the model outline is shown, in dotted lines. The boom continues forward within the nacelle in a square section, and carries opposite lateral rear strap hangers 56, and opposite lateral front strap hangers 57. For clarity of illustration the boom has been rotated 90°.

One strap hanger 56 and one strap hanger 57 on the same side of boom 24 are outwardly movable on lift hanger pins 56*a*.

The upper and lower ends of each strap hanger 56 and 57 are joined to a vertical model mounting frame 58 by lift straps 60, normal to the boom axis, the frame passing at the rear through frame aperture 61 in the boom, and in front through boom recess 62. The upper and lower frame members 63 and 64 are attached inwardly and rigidly in the wing plane to the nacelle 55 of the model, which is cut away inwardly so that no part thereof directly touches the boom, as by bolts 58*a*.

At the rear of frame 58 behind frame aperture 61 in the boom, frame 58 is attached, above and below the boom, to the boom by drag straps 65 extending parallel to the boom axis both fore-and-aft of frame 58 to drag hangers 66, one of which is movable on drag pins 67 with respect to boom 24. Lift straps 60 are preloaded by lift set screws 70 operating between the movable boom hangers and boom parallel the lift straps. The drag straps 65 are preloaded by drag set screws 71 positioned between the movable drag hanger and boom parallel to each drag strap. All straps have electric strain gages 72 attached thereto preferably on both sides of the straps, to measure tension on the straps. The straps are preferably preloaded to approximately 40% of their yield stress after attachment of the strain gages thereto, to stiffen the link between model and boom. The varying stresses on the model in its flight are transmitted directly to the frame, and from the frame to the boom through the straps, the forces acting on the straps being measured at each strap by the attached strain gages.

While preloading of the straps 60 and 65 reduces relative movement of the model with respect to the boom and cuts the strain gage output approximately in half, this preloading is highly desirable to stiffen the boom connection in order that model vibration, and the like be reduced to a minimum. Preloading also permits working the gages in both senses from a neutral condition. While the arrangement of strain gages shown in Figure 6 is such that the three components as outlined above can be measured at one time, it may be desirable for best accuracy to measure only three of these components at once. The measuring system just described has an accuracy of from 2 to 3 percent and while the gage arrangement outlined just above is preferred, many other arrangements will suggest themselves to those skilled in the art and it is not desired to limit the invention to the use of the particular strain measurement device shown herein as illustrative of a satisfactory strain measuring means between model and sled.

The strain gages when used are electrically connected as by bridge circuits to produce signals in a radio telemetering transmitter carried by the sled, these signals being radiated to the receiving station 7 and there recorded in conjunction with, for example, time and sled velocity traces; or the signals may be recorded directly on the sled.

The velocity of the sled can conveniently be recorded by placing a permanent magnet 80 on one slipper 22 of the sled 10, this magnet passing over track coils 81, as shown in Figure 2, spaced, for example, every 50 feet, thereby providing signals that can be recorded in conjunction with a time trace, the latter procedure being well known in the art. The trace resolution should be about .0001 second for the speeds contemplated, and such a system has an inherent accuracy of about one-half of one percent. Other varieties of force pickups can also be incorporated in the sled as desired, such as accelerometers, pressure gages, or other desired means for normal instrumentation techniques utilized during sled runs, and the resultant data also transmitted and recorded; or recorded directly on the sled.

While the instrumentation of the sled in a preferred form measures the forces on the sled and the aircraft model, and converts these measurements into electrical signals that may be space transmitted to a stationary ground receiving station for recording, it is not desired to be limited to a stationary positioning of the recorders. Recorders of the more sensitive galvanometer types, for example, may be rendered unreliable when mounted on the sled and accelerated rapidly, and when such recorders are utilized, it is preferred that they be positioned off the sled on the ground. However, other types of recorders, such as magnetic tape recorders are not detrimentally affected by high acceleration or deceleration rates and can be carried by the sled over the course with acceleration rates of over 25 *g*. The present invention, therefore, is deemed to include both positions of the recorders or other instrumentations required for proper preservation of measured data.

*Acceleration and free run of test sled*

The operational cycle of a test sled run can be divided into three general phases; acceleration, free substantially constant velocity run, and deceleration. During acceleration, thrusts should be high enough to keep the acceleration distance travelled to a minimum, to permit as long a free run time as possible. However, too high a thrust may be detrimental to the instrumentation carried by the sled. Acceleration values of about 15–25 times the acceleration of gravity appear to be the most practical in the light of experience gained in track tests.

To obtain such accelerations in a specific sled the following data are given:

Three acid-aniline rocket motors developing 6,000 lbs. of thrust each are used on the sled to develop a total of 18,000 lbs. thrust during the acceleration run where the weights are as follows:

| | Pounds |
|---|---|
| Sled structure | 295 |
| Model | 20 (up to 2 ft. span) |
| Instruments | 50 |
| Tanks, motors, fittings, etc | 423 |
| Fuel (3.7 sec. of acceleration) | 359 |
| Fuel (3.1 sec. of free run) | 123 |
| Air in sled at 80° F | 53 |

giving a total sled starting weight of 1,323 lbs. and providing for a speed of Mach number 1.3 during the free run, with an acceleration distance of 2,880 feet, a free run distance of 4,620 feet, and a braking distance of 2,200 to 2,500 feet. Lower Mach number speeds reduce the acceleration distance, increase the free run time and distance and somewhat reduce the fuel load. During the free run, about 7,350 lbs. of thrust is required to maintain the sled at a constant velocity of Mach number 1.3.

When an acceleration rate of 25 *g*'s is used, with a deceleration rate of 20 *g*'s, the acceleration area will only be 1,200 feet, and the braking area only 1,600 feet, leaving 7,200 feet for a constant velocity run of about 5.6 seconds at a Mach number 1.2.

*Water brakes for test sled*

Figure 7:
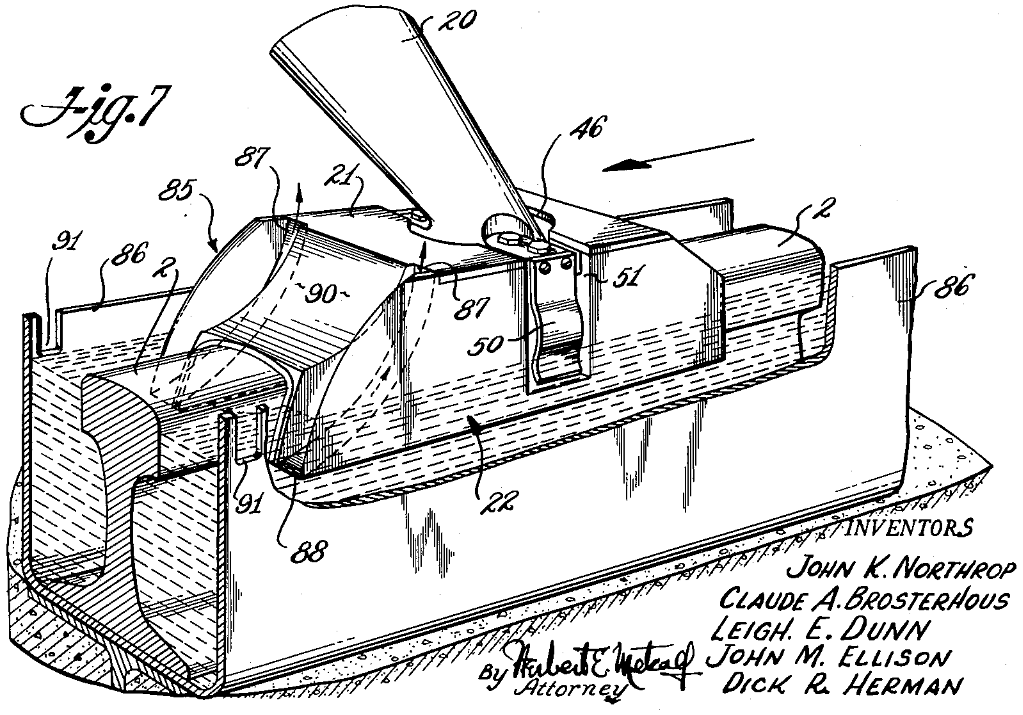
Figure 7 is a perspective view of a front slipper, rail and water trough, as used for water braking of the sled shown in Figure 2.

It will be noted that the last 1,600 to 2,500 feet of the track has been allotted as a baking area. Two types of brakes have been found satisfactory, namely a water brake and an air brake, the former being preferred, so it will be described first and in most detail, as shown in Figure 7.

The water brake broadly comprises a deflector attached to the sled, that sweeps water from a flume or trough adjacent the track bed and deflects it to produce a retarding force on the sled. A minimum weight and frontal area of the brake is desirable as these factors affect the efficiency of the sled. Also the brakes in this case should be attached to the unsprung portion of the sled, since the quantity of intake water is critical throughout the braking run at transonic speeds. Thus, water deflectors 85 are preferably a part of the front slippers and mounting casings, with water troughs 86 positioned around each of the rails in the deceleration area as shown in Figures 7 and 1.

A limiting deceleration force of 15 *g*'s is chosen for example. The theoretical minimum braking distance is 2,176 feet at that deceleration rate, when the sled enters the deceleration area at Mach number 1.3. However, this theoretical braking distance can only be approached in a practical braking system, and in the preferred system shown braking to zero velocity can be accomplished in 2,200 to 2,400 feet.

The water intake area on the slipper required must be made to vary in inverse proportion to the square of the velocity when a constant quantity of available energy is to be absorbed from the water. Thus, as the velocity approaches zero, the intake area required becomes infinitely large, while at high speeds the required intake area is very small, i. e., less than 1 square inch at 1,450 feet/second with a sled weight of 1,000 lbs. and with the water deflected through 90° to obtain a deceleration of 15 *g*'s. It is thus apparent that a satisfactory method of increasing the water intake must be variable in intake area and still be positive in holding the desired areas, because of the critical size of the latter in the initial phase of the deceleration. Also the intake area can only be increased to a practical maximum, after which it should be held constant for the remainder of the run. One positive way of achieving this result is to have the track slope with respect to the water level in the troughs 86, forcing the intake area of the deflectors 85 on the slippers to submerge at a predetermined rate as required.

The water deflector 85 is formed in the front surfaces of the two forward slippers and mounting casings as shown in Figure 7.

The sides of each slipper are both provided with forward facing curved channels 87, extending from the lower edges 88 of the sides of curving rearwardly and upwardly to emerge at the top of the mounting casing 21 to provide substantially a 90° deflection of water scooped from the troughs by the lower edges 88. The front face 90 of the mounting casing 21 is also curved rearwardly and upwardly from the top surface of rail 2 to terminate on the top surface of the mounting casing just forward of the ends of channels 87. As this front face 90 starts well above the lower edges of the channels 87, it has a different radius of curvature and a somewhat smaller deflection angle than channels 87, but has a considerably larger area.

Such a deflecting arrangement closely approaches the ideal, as the frontal area of the channels is small and increases at a low rate with change in water depth, as of course the channels engage the water before front surface 90 of the casing is submerged. No moving parts are involved.

As the velocity of the sled due to braking by water deflection in the slipper channels decreases, the change in frontal brake area must increase at a greater rate to maintain the required rate of deceleration. At this time the water level is adjusted to reach the front surface 90 of the mounting casing 21 which provides the required increase in brake area.

A total channel frontal area on each of two slippers of 7.54 square inches is sufficient to reduce the velocity of the sled previously particularly described, from 1,450 feet/second to 272 feet/second with 15 *g*'s deceleration over 2,100 feet of track. The required dip in the track with respect to the water level for this portion of the braking run is approximately 3.4 inches with a maximum angular change in 100 feet of track of approximately 3 minutes. The remainder of the run will require only 76 feet of track if the 15 *g* deceleration force could be maintained. During this portion of the run the water level is preferably varied by a series of easily broken dams, rather than by dipping the track, as the required braking area increases quite fast. The frontal area of the front surfaces 90 provides a total area of 36 square inches, which is sufficient to retard the sled to 260 feet/second. After these surfaces are submerged, however, the braking area does not increase.

Below the velocity of 260 feet/second with no further increase in braking area, the retarding force diminishes inversely with the square of the velocity, and approximately 80 feet more of braking distance is needed to reduce sled velocity to zero. The total braking distance becomes 2,100 plus 76 plus 80 totalling 2,256 feet, so that the allotted 2,500 feet is ample, and provides a leeway for slight variations in water level for example, and for variations in the entering velocity of the sled.

It is to be noted that when the deflector 85 is located on the forward slippers, the rear slippers take no part in braking during the initial deceleration. This is because the water in the path of the rear slipper is removed by the deflecting surface to form a channel in the water, and the water does not have time at high sled velocities to close in behind the front slipper before the rear slipper enters the channel. At lower speeds, however, near the end of the deceleration run, the rear slippers will submerge and aid somewhat in bringing the sled to a full stop.

Variations in water level are held to a minimum by the use of weirs 91 as shown in Figure 7. These weirs, cut in the side of the troughs, operate to hold the water level substantially constant when water is supplied to the trough at a constant rate and in small amount as by a pump (not shown). Such a level control system prevents change in water level as by evaporation, trough leakage, or by winds, and insures maximum safety in brake operation. The main consideration is to prevent the water level from falling below the minimum level required to stop the sled on the allotted length of track. A higher level merely increases the deceleration rate. An alternate way of changing the water level with relation to the deflecting surface will be decribed in the discussion of braking the launching sled. As a safety feature, it is preferred to provide a shock cord type arrestor at the end of the track.

*Air braking*

An alternate method of decelerating the sled is by the use of an air brake, as shown in Figure 8, the broad action of this brake being somewhat similar to the action of the water brake.

In Figure 8, the brake comprises a pair of brake surfaces 95 one on each side of the sled body 11 and hinged at the rear thereof to the body. The brake surfaces are preferably perforated by apertures 96 to reduce buffeting, and the surfaces 95 lies flat against the body during the acceleration and free run of the sled. As the brake surfaces are hinged at the rear they are opened automatically by the drag forces present to move outwardly across the air stream for braking during deceleration. A signal is provided to start the opening of the brake when the sled enters the deceleration area.

The dimensions of the brake will, of course, be controlled by the dimensions and weight of the sled. For the specific sled described above, assuming a sled weight of 1,000 pounds and a brake weight of 200 pounds each of the brake surfaces 95 will be 40 inches square, with 30% of the gross surface removed to provide apertures 96.

When a maximum deceleration of 15 *g*'s is the desired braking rate, the brake must open slowly, increasing the projected area at such a rate that deceleration is maintained constant at 15 *g*'s until the brake is fully opened. To control the rate of opening a hydraulic cylinder (not shown), for example, is provided for each surface attached to the sled and having the piston thereof attached to the surface through linkage 97. Metering valves can be utilized metering the fluid flow from the cylinders to provide any desired opening rate.

At 1,470 feet/second, the brakes when opened to about 12°, will provide 15 *g*'s deceleration.

When the speed has dropped to 795 feet/second the brakes can be fully opened, and the movement from 12° to 90° is to take 1.35 seconds.

The distance required to drop the velocity from 1,450 feet/second to 795 feet/second is 1,515 feet, and from 795 feet/second to zero speed is 2,570 feet, making a total braking run of 4,085 feet, that would shorten the free run considerably unless the track were to be lengthened. However, if auxiliary braking is used, such as track brake shoes or shock cord arresting gear, or even a short water brake area, after the velocity has dropped to 100 feet/second, then the full open braking run can be reduced to 2,190 feet.

If auxiliary brakes are applied at 200 feet/second, the full open braking run is reduced to 1,780 feet, so that the total air braking run is reduced to 3,335 feet. While the water brake is preferred as it has no moving parts, and stops the sled in a shorter distance, the air brake has certain definite advantages in that the braking stresses are applied directly to the body of the sled rather than through the legs thereof, and that the sled is not wetted during braking.

*Sled stability under high side loads*

When airplane models or other airfoils having a wing span on the order of three feet or more, for example, are to be held on the sled boom at relatively high angles of attack with respect to the longitudinal axis of the sled, and then progressed at transonic or supersonic speeds, the effect of the air loads imposed on the sled by the model becomes important.

These high air loads, which can easily reach forces as high as 10,000 pounds or more can, because of the vertical, forward and upper position of the model cause moments seriously affecting the stability of the sled if not counteracted. The forward location of the model with its span in a vertical plane leads to the creation of a strong yawing moment on the sled, and the upper location leads to the creation of a strong rolling moment due to high model air loads. Both of these moments, if uncompensated, must be resisted by the slippers, and in a sprung sled, these forces must be passed through the elastic mountings. The yawing moment is particularly troublesome, as the distortion of the elastic mountings might permit the sled itself to assume a substantial angle of attack as it traveled, and the angle of attack of the model would be increased, a condition that greatly increases the difficulty of obtaining reliable data on the model being transported.

If the elastic mountings are stiffened sufficiently to resist the heavy moments created by the model at high angles of attack, they can become so stiff as to be substantially useless in reducing lateral and vertical accelerations. For these reasons, it may be desirable to utilize a solidly mounted sled, and a more accurately alined track when high side loads are applied to the sled by models held thereon at high angles of attack.

Figure 10:
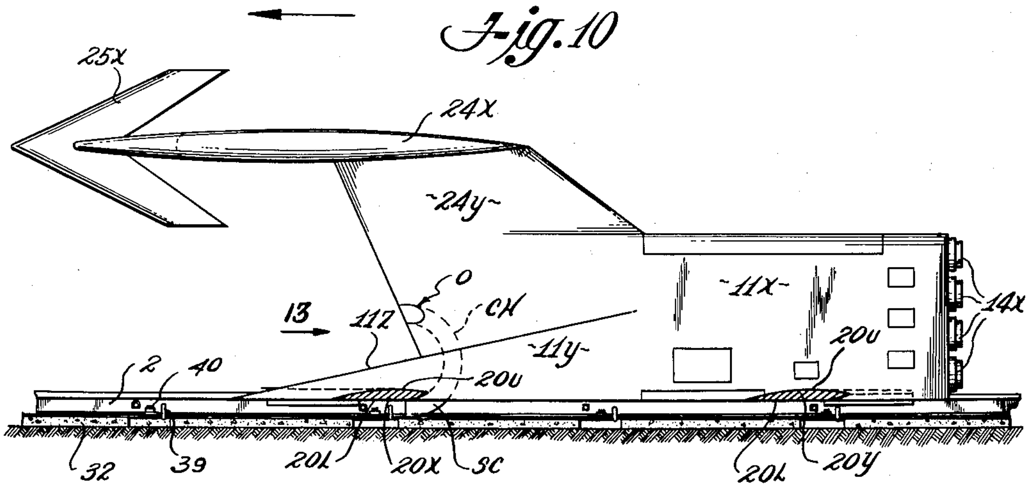
Figure 10 is a side view of the sled shown in Figure 9.

An unsprung sled especially suitable for carrying a model weighing about 150 pounds and of from 3–4 ft. span at high angles of attack at high speeds is shown in Figures 9 and 10.

Here, relatively long forward and rear water cooled slippers 22*x* and 22*y* respectively, are directly connected to wide swept-forward front legs 20*x* and wide swept-back rear legs 20*y* respectively, these legs being substantially horizontal at or near slipper level.

Swept legs 20*x* and 20*y* join the body 11*x* adjacent the lower surface thereof. The sled body 11*x* in this case is substantially rectangular, carrying four rocket motors rearwardly exhausting through tail cones 14*x* and is, in general, similar to the body 11 of the sprung sled previously described, except that in this case the overall weight of the sled is from 1,800 to 2,000 lbs.

Swept-front legs 20*x* are joined to body 11*x* through a rearwardly and upwardly extending beam 11*y* having a wedge fairing 11*z* extending in front thereof.

A heavy conical boom 24*x* is carried on a boom strut 24*y* extending upwardly and forwardly from body 11*x*, thus providing a swept-forward strut. The horizontal center line of the boom thus extends well above the top surface of the sled body 11*x*. Model 25*x* is attached to the forward end of boom 24*x* as in the previously described sled, but in this case, however, the boom is constructed to permit the model 25*x* to be carried at angles of attack up to and including 15°, for example.

As it is desirable, as pointed out in the description of the track for the prior described sled that, the lateral and vertical accelerations be limited to 0.1 *g* the unsprung sled will require closer rail tolerances than a sprung sled, and because of the high coupling loads a different slipper design is preferably utilized.

The unsprung sled just above described will satisfactorily withstand the high side loads imposed on the sled by the model 25*x* at high angles of attack. However, the loads must be transmitted through the boom 24*x*, strut 24*y*, beam 11*y* and front legs 20*x* to the front slippers 22*x* and through body 11*x* and rear legs 20*y* to the rear slippers 22*y*, thereby necessitating the use of heavy structural members extending through these parts from the model to the slippers. Thus, this particular method of combatting high side load effects results in a sled weight penalty, and this weight penalty results in a higher fuel load and fuel consumption during sled operation. At the same time, however, a stiff, stable sled is obtained, able to withstand the high air loads initiated by the model.

However, the increased weight of this type of sled, and the high side loads applied to the slippers, greatly increases the generation of heat in the slippers; sufficient to raise the temperature of metal inserts to the melting point during relatively long runs, as the heat cannot be drained away from the slipper-rail contact sufficiently fast to prevent severe insert deterioration in long runs at high speeds.

Figure 11:
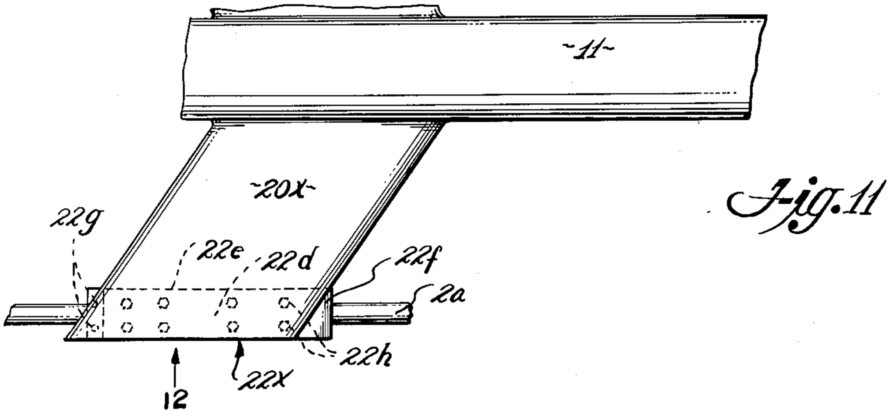
Figure 11 is a top plan view showing the attachment of water cooled slippers.
Figure 12:
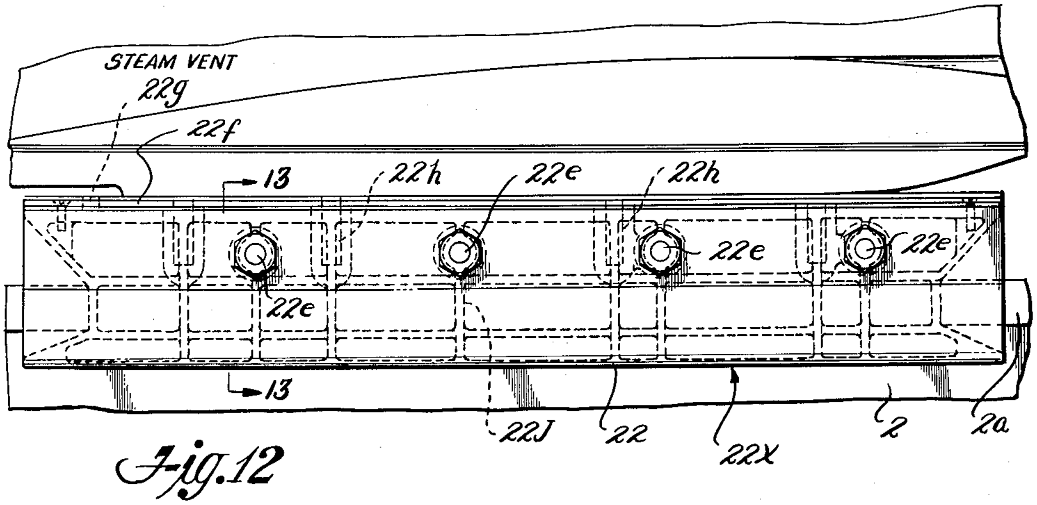
Figure 12 is a side view of the water cooled slipper shown in Figure 11 taken as indicated by the arrow 12 in Figure 11.
Figure 13:
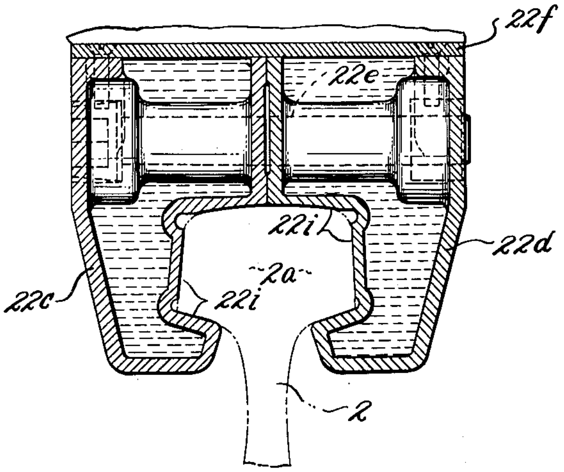
Figure 13 is a cross-sectional view of the water cooled slipper shown in Figures 11 and 12 taken as indicated by line 13—13 in Figure 12.

Two types of slipper design can be used to combat this excessive heat generation. Slipper inserts of machined carbon can be utilized, as carbon will withstand exceptionally high temperatures. However, it is preferred to use a water cooled slipper for coupling the sled to the track where high loads are being carried, and one preferred form of water cooled slipper is shown in Figures 11, 12 and 13.

Essentially the water cooled slippers comprise two hollow half slippers 22*c* and 22*d* each contoured inwardly to fit one-half of the rail head 2*a*, meeting above the rail head along the center line thereof and normally held together by heavy cross bolts 22*e* passing above the rail head. Each slipper half is smooth outside but is heavily ribbed inwardly and the two halves together will hold when full about 1½ gallons of water which is about double the amount used in a single run. The top of each slipper half is closed by a cover 22*f* having a forward steam vent 22*g* and the slippers are firmly bolted to legs 20*x* and 20*y* by vertical bolts 22*h*. The slippers are thus removable from the legs, and the halves separated if desired. This feature permits the sled to be readily removed from the track for return by truck or other means for example, or for quick change of one or both slipper halves.

No inserts are used in the water cooled slippers. Preferably the material for the slipper halves is aluminum or magnesium for best heat conductivity, and the track is lubricated as heretofore described.

The heat generated by friction is transferred through the track contacting walls 22*i* of the slipper halves and flash boils the water therein. The heat drop across these walls is not sufficient to permit melting of the slipper material as long as water remains in the slipper. As a run of the sled only takes a few seconds, only a small quantity of water is needed to protect the slippers. Vertical ribs 22*j* act as baffles to prevent significant water displacement within the slipper halves during deceleration when part of the water has been boiled away.

In this manner, the excess slipper load due to the high side forces applied to the sled when the model is progressed at high speeds and at high angles of attack, can be successfully taken by the slippers without the development of local heating sufficient to injure the slippers.

Figure 14:
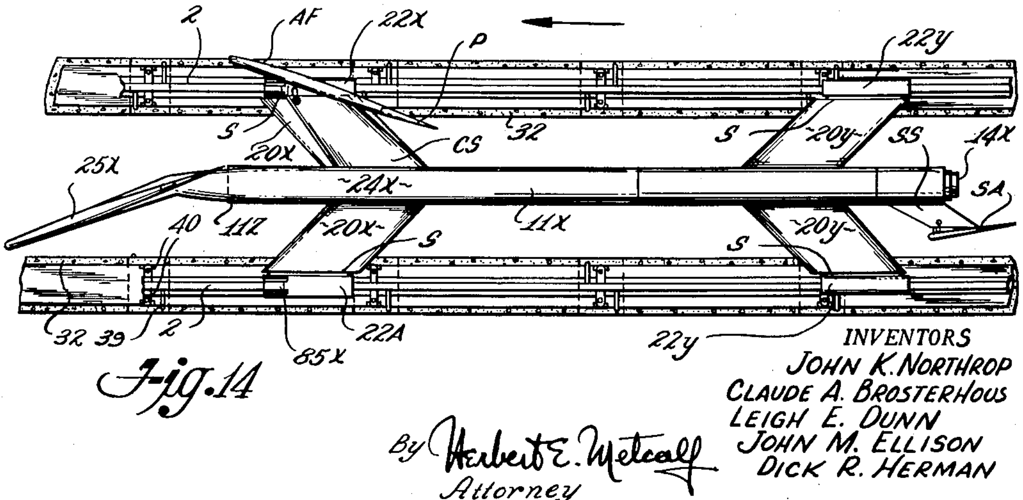
Figure 14 is a top plan view of a test facility sled in which side loads are compensated.
Figure 15:
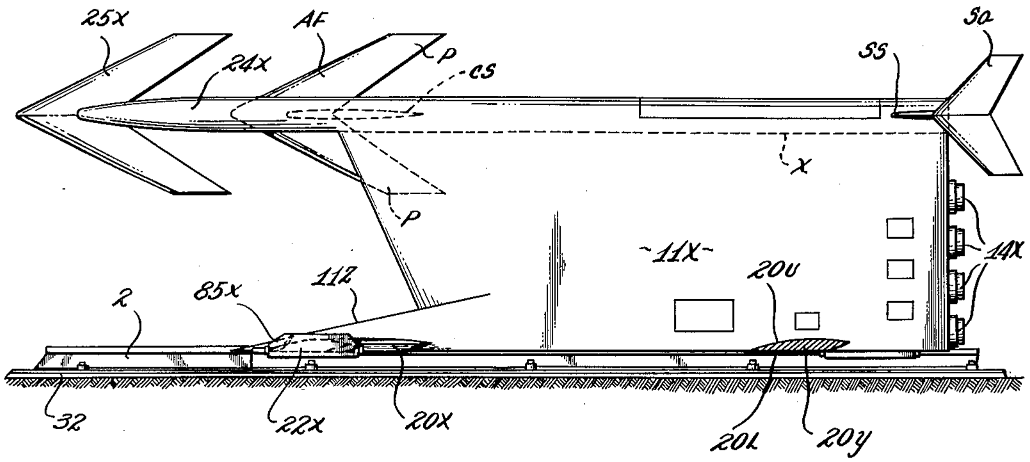
Figure 15 is a side view of the sled of Figure 11.

Another method of combatting high side loads imposed by the model on the sled, is to aerodynamically balance the side load of the model on the sled itself, so that very little of this load is transmitted to the slippers. An aerodynamically balanced sled is shown in Figures 14 and 15.

Referring to these figures, the sled has much the same configuration as the sled of Figures 9 and 10 except that the top of the sled body 11*x* is preferably made level with the top of boom 24*x*. This increase in sled body height will enable another rocket motor to be utilized if desired, or the extra space can be used for fuel. The configuration of the legs 20*x* and 20*y* is the same as that of the sled of Figures 9 and 10, except that in this case the sled can be sprung, as indicated by slipper-leg junction lines S in Figure 14. Front slippers 22*x* are provided with a water deflector 85*x* as previously described.

Positioned substantially directly above front slippers 22*x* and extending horizontally outwardly in the plane of the center line of boom 24*x* is a swept-forward compensator strut CS on which is mounted a compensating airfoil AF preferably having swept-back wing panels P. Compensating airfoil AF is rotatably attached to compensator strut CS substantially at the center of pressure of the airfoil, and is adjustable as to the angle of attack by a conventional slot and bolt assembly, for example.

Assuming that the angle of attack of model 25*x* is set to be 15° and assuming that a side load of 10,000 pounds is produced on the model in its restrained flight, the compensating airfoil is made slightly larger than the model to produce an opposite side load of about 13,000 pounds on the sled body for example. This compensating load, imposed upon the shorter moment arm of the compensating airfoil from the sled C. G., will produce an opposite moment substantially cancelling the side force moment produced by the model. In this respect, the compensating airfoil is positioned well to the rear of the model to prevent interference with the airflow thereover, and to prevent shock wave interference.

With the model side load compensated, a twisting moment is still present in the sled body due to the longitudinal spacing of the model and the compensating airfoil. This twisting moment can be removed by the use of a swept-back vertical stabilizing airfoil SA positioned on a swept-back stabilizing strut SS extending horizontally from the rear of the sled body 11*x*, also in the plane of the boom center line. Stabilizing airfoil SA is also adjustable as to angle of attack and is designed and set to provide a side force of 3,000 pounds, for example, exerted in a direction to combat the twisting moment produced by the model 25x and the compensating airfoil AF.

Thus, by aerodynamic compensation, the stresses due to model produced side force can be held to a strong upper beam as indicated by broken line X centered on the boom center line, and do not have to be transmitted through the body or legs to the slippers. The slippers have the high side and up-loads produced by the air load on the can be substantially reduced. This weight reduction, model removed therefrom, and the weight of the sled however, cannot be entirely reflected in decreased fuel consumption, as the compensating and stabilizing surfaces add a substantial drag to the sled.

An important result, however, of the compensation of the high model side loads within the sled itself is that springing can be restored, with a consequent ability of the sled to travel successfully over a track having a higher deviation tolerance that can be utilized with an unsprung sled, and the compensated sled shown in Figures 11 and 12 is shown equipped with sprung slippers.

It should be pointed out that aerodynamic compensation is complete at all significant speeds, as the air loads on the model, the compensating airfoil and the stabilizing airfoil all increase proportionally as speed is increased.

Another feature of the sleds shown in Figures 9 and 10, and 14 and 15, where wide horizontal legs 20x and 20y are used close to the ground, is the cross-sectional configuration and positioning of the legs, with respect to the body, as particularly shown in Figures 10 and 15.

A detailed analysis of slipper wear in sleds having portions thereof close to the ground has indicated that high up-loads may be imposed on the slippers at or near Mach number 1.0. It is believed that adverse compressibility conditions may be created between the sled surfaces moving close to the ground and the ground, and that these conditions may account for the production of high up-loads. Consequently, the major portions of lower surfaces 20L of the legs are preferably made flat, with the upper surfaces 20U curved, the flat lower surfaces curving upwardly at the rear of the legs to meet the upper curved surfaces. This cross-sectional contour provides a low pressure region at the lower rear of the legs to counteract any compression that might exist beneath the legs, and thus reduces the possibility of overly high up-loads being imposed upon the sled and slippers at certain critical speeds.

In this same respect, it will be noted that in this design the entire bottom surface of the sled and legs (except at the extreme rear of the legs) is in the same plane and in a plane parallel to the ground. This arrangement is also favorable for the reduction of adverse compressibility conditions beneath the sled, thereby reducing lift. It is to be noted that lift is to be avoided as far as possible, as the slippers, due to the fact that they cannot completely surround the rail, are weakest against up-loads and have the smallest rail contact surface to carry up-loads.

It will also be noted that all leading and trailing edges of the sled and members carried by the sled (except the rear rocket motor surface) are either swept-forward or swept-back, thus reducing adverse compressibility conditions throughout. In this respect, however, it should be pointed out that the model carried by beam X can be of any configuration desired.

It is thus seen that extremely high side loads can be tolerated on the sled when the sled is properly designed to transmit these loads to the slippers, and also when the side loads are aerodynamically compensated for, so that they do not reach the slippers. In the latter case, sprung sleds are satisfactory even when high side loads are applied to the sled by the model.

Figure 16:
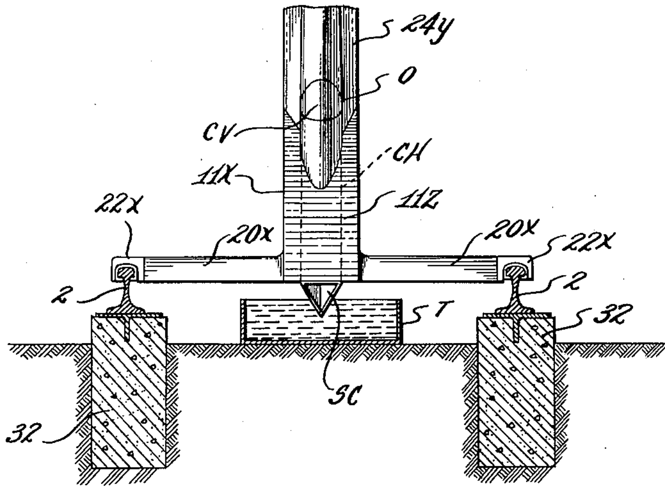
Figure 16 is a front view, partly in section and partly in elevation, of a 180° water deflector as used in the sled of Figures 9 and 10.

In the sprung sled, as shown in Figures 14 and 15, the deflector 85x for the water brake is preferably formed in the front slippers as described for the sled of Figure 2 and operates as heretofore described. In the unsprung sled, the water brake may be carried by the sled body, as shown in Figures 10 and 16.

In this case, the water is picked up by a scoop SC of triangular section, point down, extended from the bottom of the sled body just at the rear of the root chord of the front legs where the braking forces can be readily transmitted to the main structural members of the sled. The water is picked up from a central trough T between the rails 2 and is deflected 180° in an interior channel CH of round section within the sled body. The water is discharged forwardly through an opening O in the leading edge of strut 24y, this opening normally being closed by a cover CV which is blown off by inrushing water after it has been forced into channel CH by scoop S. The 180° deflection of the water provides maximum deceleration for a given amount of water picked up. Theoretically, the water issues from opening O at twice the speed of the sled. Very little water actually contacts the sled and such that does so is so finely divided that no damage is done to the sled at any speed.

*Sled velocities*

High speed test runs of a sled over a track, both incorporating principles of the present invention as outlined so far herein have been made successfully at velocities ranging from 250 feet/second to 1,495 feet/second. This latter velocity corresponded to a Mach number just over 1.3, equivalent to slightly over 1,000 miles per hour. The particular sled, travelling at this latter speed, is believed to have attained the highest velocity ever accomplished by a land vehicle of any kind.

While the free air test facility described herein is ideally suited for the testing of complete airplane models, it is to be distinctly understood that the word model as used herein includes airfoil or similar surfaces alone, wingless bodies and/or structures of any size and shape that can be mounted on the sled boom and for which aerodynamic data are desired. Furthermore, while the invention is particularly adapted to obtain accurate aerodynamic data in the range of speeds from Mach number .8 to 1.3, where other types of facilities are less valuable, it will be obvious to those skilled in the art that the sled can be driven at lower speeds with equal accuracy of data determination; and that by increasing rocket power and lengthening the track, higher supersonic speeds of the sled can be readily be obtained. Thus, we do not desire to be limited to any particular speed range even though one preferred range is set forth herein as being in the transonic region.

*Launching facility*

As an example of the use of the landcraft of the present invention modified for the launching of aircraft capable of free flight, at subsonic velocities, a preferred track and cooperating sled useful for launching aircraft weighing in the neighborhood of 20,000 to 40,000 lbs. or more at from 200 to 400 miles per hour with recovery of the sled in undamaged condition, will next be described, as shown in Figures 17–20 inclusive.

*Launching track*

Referring first to Figure 17, track 1 in this case is also laid on a heavy concrete foundation, but comprises heavyweight parallel railroad rails 2 having hold-down and adjustment fixtures 100 spaced along the rail at 3 to 4 foot intervals (Figure 18). As the exceedingly close tolerances required for the test facility track are not needed for the launching track, the track may be built by using standard railroad rails. Such a track can easily be set up to have maximum variations from parallel straight lines of about ⅛ inch. A preferred launching track is 1000 feet long with an acceleration area of about 640 feet with a deceleration area of 360 feet. No constant velocity area is needed.

*Launching sled*

One form of launching sled 101 is shown in Figure 17. The frame of the sled comprises three 12 inch O. D. aluminum alloy tubes, two thrust tubes 102 inclined forwardly and upwardly, and a lower frame tube 103 parallel to the ground, all tubes being joined in front by a front casting 104, and at the rear by rear casting 105. The tubes in this instance are 300 inches long.

Thrust tubes 102 are provided with liquid fuel rocket motors 106 back of rear casting 105, exhausting coaxially with thrust tubes 102, and cylindrical tanks 107 of stainless steel are mounted on frame tube 103 for holding the propellant fuels and the compressed gas used to provide propellant feed to the rocket motors 106.

Thrust tubes 102 are continued forwardly of front casting 104 as brace rods 108 terminating in rocking slide bearings 109. Brace rods 108 are cross-braced to front casting 104 by brace rods 110.

*Thrust members*

On top of front casting 104, just above the junction of each thrust tube 102 therewith, is positioned a thrust member 111 capable of rotating forwardly and outwardly but not rearwardly. Each thrust is held substantially vertically by thrust rods 112 attached to the top of each thrust member 111 and extending downwardly through the respective rocking bearings 109. Each thrust rod 112 terminates in a thrust shoulder forward of bearing 109 so that brace rods 112 transmit thrust from the rocket motors 106 from thrust tubes 102 to the tops of thrust members 111. Thrust members 111 are urged to rotate forwardly and outwardly when otherwise unrestrained, by thrust member rotators 114 positioned behind each thrust member. These rotators may be spring operated or operated by the compressed gas carried on the sled.

An aircraft to be launched, indicated only as to fuselage by broken line X, is supported forwardly on the tops of the thrust members 111 and rearwardly on saddle 115 positioned above the rear casting 105 and the rocket motors 106. The aircraft is provided with thrust pins 116 projecting laterally on each side of the fuselage thereof, and when the aircraft is mounted on the sled, these pins fit into thrust member recesses 117 as shown in Figure 17*a*. The rear portion 118 of the recess slopes slightly forward. The thrust members immediately fold out of the way under the urge of rotators 114 as the aircraft first moves ahead of the sled under its own power and the pins 116 clear the recesses 117, thereby precluding fouling of the rear of the airplane by the thrust members 111. The upward inclination of the thrust tubes 102 and downward inclination of the rocket blasts minimizes upward thrust on the front slippers.

*Launching sled slippers and elastic mountings*

The launching sled slippers and elastic mountings are shown in Figure 18. Except for being larger and longer than the test facility sled slippers, the landing sled slippers are very similar thereto. In this case, however, all four slippers 120 are alike and are provided with stainless steel inserts 120*a* and with upper longitudinal air-cooling fins 121.

The sled is suspended on four elastic mounting boxes 124 attached to the front and rear castings 104 and 105, each box extending downwardly to support a horizontal rod 125 positioned normal to the rail, and attached at one end to a slipper 120 and at the other end to a casting bracket 126. Rod 125 passes through apertures 127 in box 124, and inside the box the rod 125 is tied to the box through a vertical metal block and rubber blocks, as in the elastic mounting previously described. However, as the weights to be carried by the landing sled are greater, the spring mountings are more massive than those used in mounting the test facility sled. The speed of the launching sled is measured as described for the facility sled.

*Water brake for launching sled*

As the launching speeds contemplated for the launching sled are considerably lower than the speeds of the test facility sled, but are still high, it is preferred to use a water brake to decelerate the launching sled after the aircraft has been launched therefrom. Furthermore, due to the lower speeds involved, it is practical to mount the water deflector on the sprung portion of the sled. A water brake found satisfactory to decelerate the launching sled to a stop from 300 M. P. H. in less than 300 feet, is shown in Figures 19, 19*a* and 20, which will next be referred to.

In this case, the deflector is an inch steel pipe 130 extending forwardly and downwardly below frame tube 103 to open forwardly and centrally between the rails of the track as shown in Figure 19. Deflector pipe 130 is supported at its open end by front support bracket 131.

At the rear of pipe 130, the end thereof is divided by a vertical separation plate 132 which forms the leading edge of two channels 133 between channel plates 134 and 135, channels 133 curving through 90° on either side of the center line of the sled to discharge the scooped water laterally as shown in Figure 19*a*. Plate 134 is solidly attached to frame tube 103 by rear brackets 136.

The water used for braking is, in this embodiment, held in a single trough 137 positioned between rails 2 as shown in Figure 20. The water is held at various desired levels along the trough by frangible dams 138 formed of tar paper for example, so that the forward opening of deflector tube 130 will submerge deeper and deeper in the water as the sled is decelerated. These depths will, of course, vary with the weight of the sled and entrance velocity. The water levels are controlled by weirs 91*a*.

Values for one specific launching sled follow:

| | |
|---|---|
| Sled weight empty____________lbs__ | 2,500 |
| Sledge weight with fuel____________lbs__ | 4,500 |
| Aircraft weight____________lbs__ | 18,000 to 30,000 |
| Thrust required____________lbs__ | 113,000 to 172,000 |
| Launching velocity____________M. P. H.__ | 304 |
| Launching time ____________sec. at 4.7 *g*__ | 2.88 |
| Launching distance____________feet__ | 640 |
| Deceleration distance____________do____ | 300 |
| Total track length____________do____ | 1,000 |

*Sled return*

All of the sleds herein described may be conveniently returned to the starting position after traversal of the track by the use of a rail car to tow the sled back over the track. Preferably the wheels of this car should have a rubber tread to prevent any possibility of the rails being scored or otherwise damaged by the rail car wheels. In some cases where heavy sleds are used it is preferable to uncouple the sled, lift it off the track and return it by truck for example.

*Summary*

It will be seen from the above descriptions of two aspects of the present invention that the restrained sled herein described is suitable without modification of the basic principles thereof for use from moderately high to extremely high velocities as transport means for aircraft, full or subscale, with recovery of the landcraft undamaged in all instances.

One important feature of the deceleration by water braking of particular sleds of either type is to be particularly noted. When the highest desired velocity of the sled is decided upon, M=1.3 for example, and the deceleration rate and track distance determined for proper deceleration of that particular sled by water braking, then thereafter deceleration of that sled at all velocities either lower or higher is self-compensating, i. e., the sled will never run off the track, but will in fact always come to rest within the distance allotted without requiring any change in water deflector area or water levels. The deceleration rates will change, but the distance travelled before the sled comes to rest will not vary greatly. This feature is of great aid in making trial runs at velocities below those finally contemplated. By proper adjustment of rocket power the acceleration rate can be controlled and the resultant deceleration rate after a subspeed run will be roughly comparable to the acceleration rate, if both rates are arranged to be substantially equal on the full speed run. It is also an important safety factor in that in the event the sled should enter the deceleration area at a substantially higher speed than expected, it will not run off the track. A few hundred excess feet of braking area is sufficient to provide for all contingencies. However, in case of a braking accident it is preferred to end the track with a shock cord arrestor.

It has been pointed out above that an ideal brake should have no moving parts, should be positive and accurate in action, and economical to operate. The water brake herein described meets these requirements. No moving parts (other than relative motion of deflector and water) are present, and water levels are accurately maintained. Self-compensation for accidental speeds is inherent.

The water brake is also a very economical method of dissipating a tremendous amount of energy with the addition of very little weight to the sled. Energy is taken from one particular sled, for example, at an initial velocity of 1,450 feet/second, at the rate of 39,600 horsepower, with less than one square inch of water intake area.

The light test sled first particularly described herein, can be brought to rest after a constant velocity run of about M=1.3 with the use of only about 6,000 gallons of water in the troughs. At a cost of $2.00 per 1,000 gallons the total water cost per run, assuming none remains in the troughs, is only $12.00. Contrast this cost with the cost of accelerating the same facility sled to M=1.3 under rocket power with the expenditure of 482 pounds of fuel at a cost of about 15¢ per pound, a total cost of $72.00. If rocket power were also to be used for deceleration this fuel cost would rise to an uneconomical figure when repeated runs are to be made.

It can be readily seen from the above description of the two aspects of the invention disclosed herein that the landcraft of the present invention is suitable for a wide variety of uses requiring a wide range of speeds and weights. The test facility sleds described particularly herein have starting weights of about 1,300 pounds to 2,000 pounds and one such sled has travelled at velocities of over 1,000 M. P. H. over the track. On the other hand, the launching sled, with a starting weight of 34,500 pounds can be accelerated to more than 300 M. P. H. and recovered on a very short track. Such versatility clearly proves the practical effectiveness of the present invention over a wide range of sled weights and sled velocities.

While the sleds herein described are primarily adapted for the transport of aircraft, large or small, the supersonic sleds described herein are equally well adapted for many other purposes, a few of the more important uses being listed as follows:

*a.* The transport of ram jets or other engines, cold or live, at subsonic, transonic and supersonic velocities.

*b.* The study of high accelerations on the behavior of rockets themselves, including solid fuel rockets.

*c.* The study of the effect of projectiles on materials moving at high velocities under air load.

*d.* The study of skin effects on bodies of various configurations at transonic and supersonic velocities.

*e.* The study of the separation of two bodies at subsonic, transonic and supersonic speeds.

*f.* The study of the optical effects of boundary layers on optical instruments carried by a body moving at transonic and supersonic speeds.

Many other uses within the scope of the appended claims will suggest themselves to those skilled in the art. In consequence, no limitation to the invention is desired as to the type of materials to be transported by the sled, as in many instances only the sled body itself need be propelled.

From the above description it will be apparent that there is thus provided a device of the character described possessing the particular features of advantage before enumerated as desirable, but which obviously is susceptible of modification in its form, proportions, detail construction and arrangement of parts without departing from the principles involved or sacrificing any of its advantages.

While in order to comply with the patent statutes, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

What is claimed is:

1. In a high speed sled for testing an airfoil surface at transonic speeds in open air propulsion over track rails, a plurality of slippers mounted to slide on said rails and shaped to transmit down, side and up loads to said rails, a sled body, legs extending outwardly from said body and connecting said body to said slippers, a swept forward strut projecting forwardly and upwardly from said body, a boom projecting forward from said strut, a test airfoil positioned on the forward end of said boom in a position to produce a substantial side force on said sled when progressed over said track, and a rocket motor exhausting at the rear of said body for progressing said sled over said track.

2. Apparatus in accordance with claim 1, wherein four horizontally extending legs are attached to said body, the two forward legs being swept forward, the two rear legs being swept back and wherein the bottom of said body is in a horizontal plane and wherein the bottom surface of said legs extends outwardly to said slippers in the same plane.

3. Apparatus in accordance with claim 1, wherein four horizontally extending legs are attached to said body, the two forward legs being swept forward, the two rear legs being swept back and wherein the bottom of said body is in a horizontal plane and wherein the bottom surface of said legs extends outwardly to said slippers in the same plane and wherein the top surface of said legs is curved to meet said bottom surface at the rear of said legs at a point just above said plane.

4. Apparatus in accordance with claim 1, wherein means are provided on said sled to intercept a fluid resting in the path of said sled adjacent said track and shaped to deflect said fluid 180°.

5. Apparatus in accordance with claim 1 wherein a brake surface is rigidly attached to each of the forward slippers of said sled to intercept a quantity of water in the path of said sled adjacent said rails, and wherein said sled body is mounted on said plurality of slippers through elastic mountings for restrained relative movement in all directions.

6. Apparatus in accordance with claim 1 wherein rigidly mounted braking means are provided on said sled to intercept a fluid resting in the path of said sled adjacent said track, said intercepting means being of triangular cross section at the point of fluid contact, with an apex of the triangle pointing downwardly.

7. In a high speed sled for testing an airfoil surface at transonic speeds in open air propulsion over track rails, a plurality of slippers mounted to slide on said rails and shaped to transmit down, side and up loads to said rails, a sled body, legs extending outwardly from said body and connecting said body to said slippers, a swept forward strut projecting forwardly and upwardly from said body, a boom projecting forward from said strut, a test airfoil positioned on the forward end of said boom in a position to produce a substantial side force on said sled when progressed over said track, an airfoil mounted in position on said sled to produce a side force opposing the side force produced by said test airfoil and rearwardly of the test airfoil; an additional airfoil mounted on said sled in position to exert a force opposing the yawing moment produced by said test airfoil and airfoil opposing the side force produced by said test airfoil, and propelling means mounted on said sled.

8. Means for obtaining reliable aerodynamic data in the transonic speed range utilizing a high speed sled for open air propulsion, and track rails on which said sled is mounted on slippers formed to slide over, while substantially restrained from other movement by, said rails, characterized by deceleration means having a channel containing water extending along the track, a brake surface mounted on the sled, said brake surface being engaged with the water in the channel in a manner for varying the amount of fluid displaced per unit of distance traveled during deceleration of said sled to provide a safe deceleration rate; a boom extended forwardly from said body, a member, having a surface on which data is to be obtained, supported by said boom, means on the sled for accelerating said sled in open air to velocities including supersonic velocities, and means on the sled for measuring aerodynamic forces acting on said surface.

9. Apparatus in accordance with claim 8, wherein said fluid is water positioned in a channel arranged as a trough around each rail and wherein said brake surface is on the front of each forward slipper.

10. Apparatus in accordance with claim 9, and wherein said rails dip to enter the water in said trough to completely submerge said brake surface before the end of said track is reached.

11. A high speed sled comprising: a rail track; a sled slidable therealong; means to accelerate said sled along a portion of said track; and deceleration means comprising a channel containing water extending along said track, and water-deflecting sled-braking scoop means mounted on said sled for dipping into the water in said channel and accelerating the water at a substantial angle to the direction of travel of said sled, said braking means and level of the water in said channel being arranged so that a substantially continuously increasing water-scooping frontal area of said scoop means dips into the water during at least a major portion of a deceleration distance.

12. Apparatus in accordance with claim 11, wherein the relative levels of the water and the track vary along the major braking portion so that the frontal area of the braking means increasingly dips into the water at a rate substantially inversely proportional to the square of the velocity of the sled in order to maintain a substantially constant braking force during the portion.

13. A slipper for mounting a sled for travel on a track rail at transonic and supersonic speeds comprising; a light-weight heat-conducting metallic hollow body having track-bearing surfaces and an interior chamber adapted to carry water therein in heat exchange relation with the interior surfaces of the walls of said body which form said bearing surfaces; and transverse baffles in said chamber to more effectively maintain said relation during acceleration and deceleration of the sled.

14. A high speed sled comprising: a rail track; a sled slidable therealong; means to accelerate said sled along a portion of said track; and deceleration means comprising a channel containing water extending along said track, and sled-braking scoop means mounted on said sled for dipping into the water in said channel, conduit means on said sled for receiving water from said scoop means and having an exit port in a leading edge of said sled through which the scooped water emerges, and a cover for said port removable under pressure exerted by the scooped water.

15. Apparatus in accordance with claim 8 wherein the brake surface is rigidly mounted on the sled and arranged and shaped to engage with the water and accelerate it in a direction at least substantially 90° relative to the direction of travel of the sled.

References Cited in the file of this patent

UNITED STATES PATENTS

| | | |
|---|---|---|
| 490,704 | Woodcock | Jan. 31, 1893 |
| 1,007,467 | Mangels | Oct. 31, 1911 |
| 1,039,889 | Brianne | Oct. 1, 1912 |
| 1,363,100 | English | Dec. 21, 1920 |
| 1,411,597 | Trask | Apr. 4, 1922 |
| 1,498,023 | Fales | June 17, 1924 |
| 1,614,841 | Kruckenberg et al. | Jan. 18, 1927 |
| 1,685,035 | Robertson | Sept. 18, 1928 |
| 1,797,833 | McQueer | Mar. 24, 1931 |
| 1,798,940 | Heinkel | Mar. 31, 1931 |
| 1,887,528 | Stein | Nov. 15, 1932 |
| 1,946,018 | Fredrickson | Feb. 6, 1934 |
| 2,100,065 | Breckwater | Nov. 23, 1937 |
| 2,136,733 | Dean | Nov. 15, 1938 |
| 2,149,161 | Byrnes | Feb. 28, 1939 |
| 2,172,567 | Peycke et al. | Sept. 12, 1939 |
| 2,344,945 | Knox et al. | Mar. 28, 1944 |
| 2,370,347 | Goebel | Jan. 27, 1945 |
| 2,369,859 | Sargeant | Feb. 20, 1945 |
| 2,402,379 | Ganahl | June 18, 1946 |
| 2,413,723 | Maxson et al. | Jan. 7, 1947 |
| 2,436,240 | Wiertz | Feb. 17, 1948 |
| 2,534,453 | Kantola | Dec. 19, 1950 |

FOREIGN PATENTS

| | | |
|---|---|---|
| 22,407 | Great Britain | 1911 |
| 496,662 | France | Nov. 13, 1919 |
| 649,712 | France | Sept. 4, 1928 |
| 782,490 | France | Mar. 18, 1935 |
| 637,842 | Great Britain | May 24, 1950 |

OTHER REFERENCES

Rockets, Willy Ley plate VI (between pp. 4 and 5).

Scientific American, August 1931, page 124.

Rocket Research, plate II 2nd edition, January 1945, C. P. Lent SI call #TL 782.L36.